(12) United States Patent
Park et al.

(10) Patent No.: US 11,782,289 B2
(45) Date of Patent: *Oct. 10, 2023

(54) DISPLAY DEVICE AND PANEL BONDING SYSTEM INCLUDING THE SAME

(71) Applicants: SAMSUNG DISPLAY CO., LTD., Yongin-si (KR); Jastech, Ltd., Incheon (KR)

(72) Inventors: Jeong Woo Park, Yongin-si (KR); Jae Joong Kwon, Suwon-si (KR); Beom Shik Kim, Yongin-si (KR); Jin Cheol Seo, Asan-si (KR); Young Sang Ha, Suwon-si (KR); Joo Young Oh, Asan-si (KR); Jae You Yi, Asan-si (KR)

(73) Assignees: SAMSUNG DISPLAY CO., LTD., Yongin-si (KR); JASTECH, Incheon (KR)

( * ) Notice: Subject to any disclaimer, the term of this patent is extended or adjusted under 35 U.S.C. 154(b) by 4 days.

This patent is subject to a terminal disclaimer.

(21) Appl. No.: 17/195,799

(22) Filed: Mar. 9, 2021

(65) Prior Publication Data
US 2021/0286194 A1 Sep. 16, 2021

(30) Foreign Application Priority Data
Mar. 10, 2020 (KR) .................. 10-2020-0029404

(51) Int. Cl.
*G02B 30/29* (2020.01)
*B32B 7/12* (2006.01)
(Continued)

(52) U.S. Cl.
CPC .............. *G02B 30/29* (2020.01); *B32B 7/12* (2013.01); *B32B 37/12* (2013.01); *B32B 37/18* (2013.01);
(Continued)

(58) Field of Classification Search
None
See application file for complete search history.

(56) References Cited

U.S. PATENT DOCUMENTS 6,151,062 A * 11/2000 Inoguchi ............... H04N 13/32
348/42
8,810,741 B2 8/2014 Liao et al.
(Continued)

FOREIGN PATENT DOCUMENTS

JP 2012-181221 9/2012
JP 6497672 4/2019
(Continued)

*Primary Examiner* — Francisco W Tschen
*Assistant Examiner* — Abhishek A Patwardhan
(74) *Attorney, Agent, or Firm* — F. Chau & Associates, LLC

(57) ABSTRACT

A display module includes a display panel having a plurality of pixels and a display driver configured to drive a partial portion of the plurality of pixels that are positioned in an alignment mark area to display an alignment mark in the alignment mark area. A stereoscopic lens including a base is disposed on the display module. A plurality of lenses is disposed on the base and includes at least one flat portion surrounded by the plurality of lenses and overlapping the alignment mark area.

19 Claims, 21 Drawing Sheets

(51) Int. Cl.
*B32B 37/12* (2006.01)
*B32B 38/18* (2006.01)
*B32B 37/18* (2006.01)
*B32B 38/00* (2006.01)

(52) U.S. Cl.
CPC ...... *B32B 38/0008* (2013.01); *B32B 38/1833* (2013.01); *B32B 2457/20* (2013.01); *B32B 2551/00* (2013.01)

(56) References Cited

U.S. PATENT DOCUMENTS

| | | | | |
|---|---|---|---|---|
| 2008/0068720 | A1* | 3/2008 | Shigemura | G02B 3/0025 359/619 |
| 2013/0176525 | A1* | 7/2013 | Liao | G02B 30/27 349/191 |
| 2015/0162362 | A1* | 6/2015 | Wong | H04N 13/327 29/729 |

FOREIGN PATENT DOCUMENTS

| | | |
|---|---|---|
| KR | 10-2015-0074452 | 7/2015 |
| KR | 10-1925459 | 12/2018 |

* cited by examiner

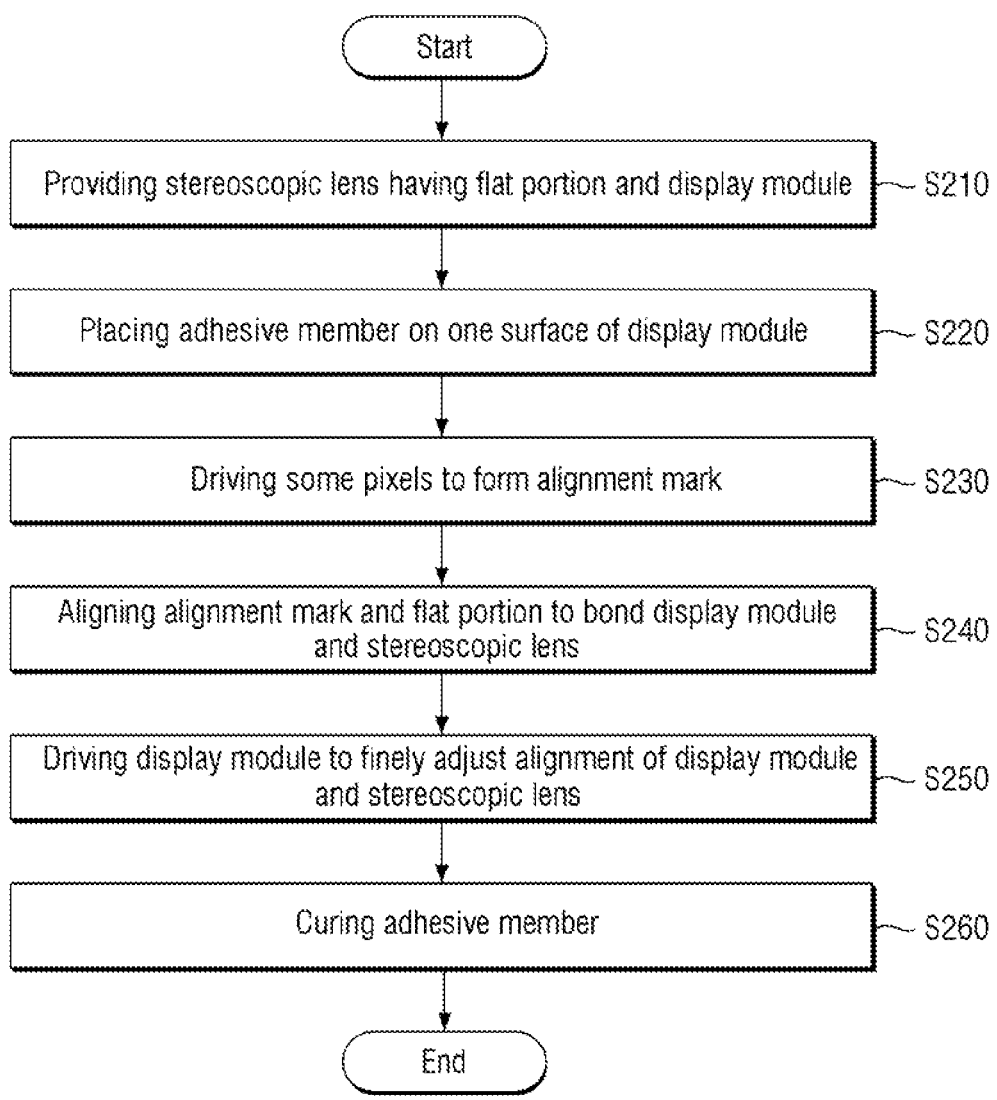

DISPLAY DEVICE AND PANEL BONDING SYSTEM INCLUDING THE SAME

This application claims priority under 35 U.S.C. § 119 to Korean Patent Application No. 10-2020-0029404, filed on Mar. 10, 2020 in the Korean Intellectual Property Office, the disclosure of which is incorporated by reference in its entirety herein.

1. TECHNICAL FIELD

The present inventive concepts relate to a display device and a panel bonding system including the same.

2. DISCUSSION OF RELATED ART

Stereoscopic image display devices are classified into binocular parallax type stereoscopic image display devices and complex parallax perception type stereoscopic image display devices. Binocular parallax type stereoscopic image display devices use parallax images of left and right eyes and are classified into glass-type stereoscopic image display devices and glass-free stereoscopic image display devices. Each of these types of stereoscopic image display devices have been put to practical use. A glass-type stereoscopic image display device changes the polarization of left and right parallax images on a direct-view display device or a projector. The glass-type stereoscopic image display device displays the polarized left and right parallax images, and implements a stereoscopic image using a polarizing glass. Alternatively, the glass-type stereoscopic image display device displays left and right parallax images in a time-division manner and implements a stereoscopic image using a shutter glass. A glass-free stereoscopic image display device separates the optical axes of left and right parallax images using an optical plate such as a parallax barrier or a lenticular sheet to implement a stereoscopic image.

Such a stereoscopic image display device may be manufactured using a bonding apparatus for bonding a display panel and a stereoscopic lens.

SUMMARY

Aspects of the present inventive concepts are to provide a display device in which alignment marks may be formed using some pixels in a display area, thereby reducing the size of alignment marks and improving alignment precision, and a panel bonding system including the display device.

However, aspects of the present inventive concepts are not restricted to the one set forth herein. The above and other aspects of the present inventive concepts will become more apparent to one of ordinary skill in the art to which the present invention pertains by referencing the detailed description of the present invention given below.

According to an exemplary embodiment of the present inventive concepts, a display module includes a display panel having a plurality of pixels and a display driver configured to drive a partial portion of the plurality of pixels that are positioned in an alignment mark area to display an alignment mark in the alignment mark area. A stereoscopic lens including a base is disposed on the display module. A plurality of lenses is disposed on the base and includes at least one flat portion surrounded by the plurality of lenses and overlapping the alignment mark area.

The flat portion may expose a part of an upper surface of the base.

One side of the at least one flat portion may be inclined from an extending direction of the plurality of lenses.

One side of the at least one flat portion may be parallel or perpendicular to an extending direction of the plurality of lenses.

The stereoscopic lens may include a flat portion disposed at a center of the stereoscopic lens.

The stereoscopic lens may include a plurality of flat portions symmetrical to each other with respect to a center point of the stereoscopic lens.

According to an exemplary embodiment of the present inventive concepts, a panel bonding system includes a display module including a display panel having a plurality of pixels and a display driver configured to drive a partial portion of the plurality of pixels that are positioned in an alignment mark area to display an alignment mark in the alignment mark area. A stereoscopic lens including a base is disposed on the display module. A plurality of lenses is disposed on the base and includes at least one flat portion surrounded by the plurality of lenses and overlapping the alignment mark area. A panel bonding apparatus is configured to align the at least one flat portion and the alignment mark displayed by the partial portion of the plurality of pixels to bond the display module and the stereoscopic lens.

The display panel may comprise: a display area including the plurality of pixels, and an alignment mark area disposed in the display area and overlapping the at least one flat portion.

The alignment mark may be formed by driving pixels arranged in a predetermined row and pixels arranged in a predetermined column intersecting the predetermined row among the some pixels in the alignment mark area.

The plurality of pixels may include a plurality of unit pixels each including first to third sub-pixels, and the alignment mark may be formed by lighting unit pixels arranged in a predetermined row and unit pixels arranged in a predetermined column intersecting the predetermined row among the some pixels in the alignment mark area.

The plurality of pixels may include a plurality of first to third sub-pixels, and the alignment mark may be formed by lighting first sub-pixels arranged in a predetermined row and first sub-pixels arranged in a predetermined column intersecting the predetermined row among the some pixels in the alignment mark area.

The panel bonding apparatus may comprise: a camera unit photographing alignment of the at least one flat portion and the alignment mark to generate image data, an alignment calculation unit calculating a horizontal distance and vertical distance for alignment adjustment based on the image data to generate alignment data, and a bonding unit bonding the display module and the stereoscopic lens based on the alignment data.

The bonding unit may comprise: an adhesive material supply module providing an adhesive member between the display module and the stereoscopic lens, a bonding module attaching the display module and the stereoscopic lens using the adhesive member and adjusting the alignment of the display module and the stereoscopic lens based on the alignment data, and a curing module irradiating the adhesive member with light to cure the adhesive member.

The bonding unit further may comprise: an adjustment module driving the display module after the alignment of the display module and the stereoscopic lens is adjusted by the bonding module, to finely adjust the alignment of the display module and the stereoscopic lens.

The adjustment module may perform the fine adjustment based on degree of clearness of light emitted from the display module, passed through the stereoscopic lens and reaching a specific field of view.

The flat portion may expose a part of an upper surface of the base.

One side of the at least one flat portion may be inclined from an extending direction of the plurality of lenses.

One side of the at least one flat portion may be parallel or perpendicular to an extending direction of the plurality of lenses.

The stereoscopic lens may include a flat portion disposed at a center of the stereoscopic lens, and the display panel may include an alignment mark area corresponding to a position of the flat portion.

The stereoscopic lens may include a plurality of flat portions symmetrical to each other with respect to a center point of the stereoscopic lens, and the display panel may include a plurality of alignment mark areas corresponding to positions of the plurality of flat portions.

According to an exemplary embodiment of the present inventive concepts, a display device includes a display module including a display panel having a plurality of pixels and a display driver configured to drive a partial portion of the plurality of pixels that are positioned in an alignment mark area to display an alignment mark in the alignment mark area. A stereoscopic lens includes a plurality of lenses, and at least one flat portion surrounded by the plurality of lenses, the at least one flat portion overlapping the alignment mark area.

BRIEF DESCRIPTION OF THE DRAWINGS

The above and other aspects and features of the present invention will become more apparent by describing in detail exemplary embodiments thereof with reference to the attached drawings, in which:

FIG. 21 is a flowchart illustrating a panel bonding process according to another exemplary embodiment of the present inventive concepts.

DETAILED DESCRIPTION OF EXEMPLARY EMBODIMENTS

Figure 1:
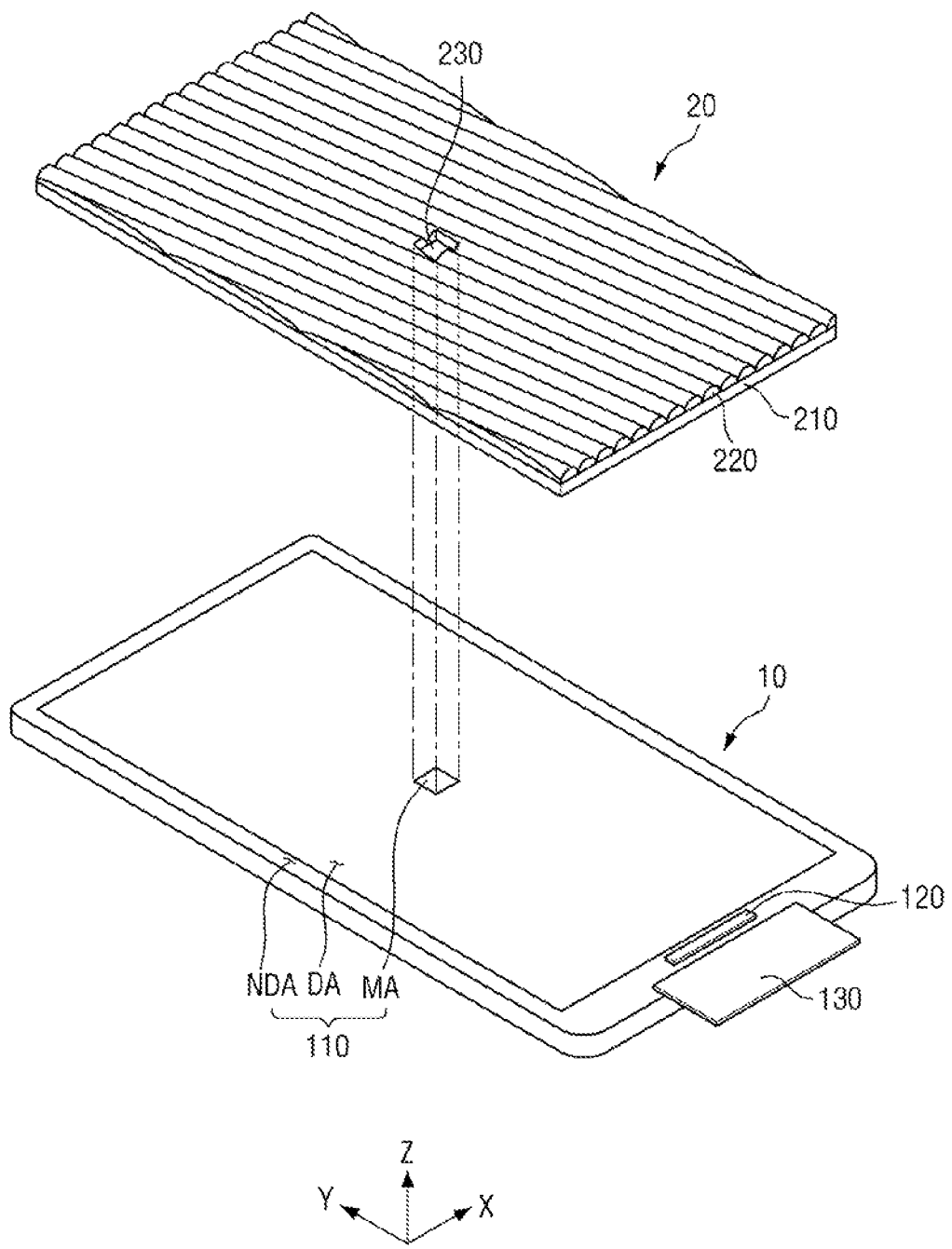
FIG. 1 is an exploded perspective view of a display device according to an exemplary embodiment of the present inventive concepts.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the present inventive concepts disclosed herein. It is apparent, however, that various exemplary embodiments may be practiced without these specific details or with one or more equivalent arrangements. In other instances, well-known structures and devices are shown in block diagram form to avoid unnecessarily obscuring various exemplary embodiments. Further, various exemplary embodiments may be different, but do not have to be exclusive. For example, specific shapes, configurations, and characteristics of one exemplary embodiment may be used or implemented in another exemplary embodiment without departing from the present inventive concepts.

Unless otherwise specified, the illustrated exemplary embodiments are to be understood as providing exemplary features of varying detail of some ways in which the present inventive concepts may be implemented in practice. Therefore, unless otherwise specified, the features, components, modules, layers, films, panels, regions, and/or aspects, etc.

(hereinafter individually or collectively referred to as "elements"), of the various embodiments may be otherwise combined, separated, interchanged, and/or rearranged without departing from the present inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. However, when an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular to one another, or may represent different directions that may cross each other but are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XY, YZ, and ZZ. As used herein, the term "and/or" includes any and all combinations of one or more of the associated listed items.

Although the terms "first," "second," etc. may be used herein to describe various types of elements, exemplary embodiments of the present inventive concepts should not be limited by these terms. These terms are used to distinguish one element from another element. Therefore, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Therefore, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular exemplary embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Therefore, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In instances of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the present inventive concepts. Further, the blocks, units, and/or modules of some exemplary embodiments may be physically combined into more complex blocks, units, and/or modules without departing from the scope of the present inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
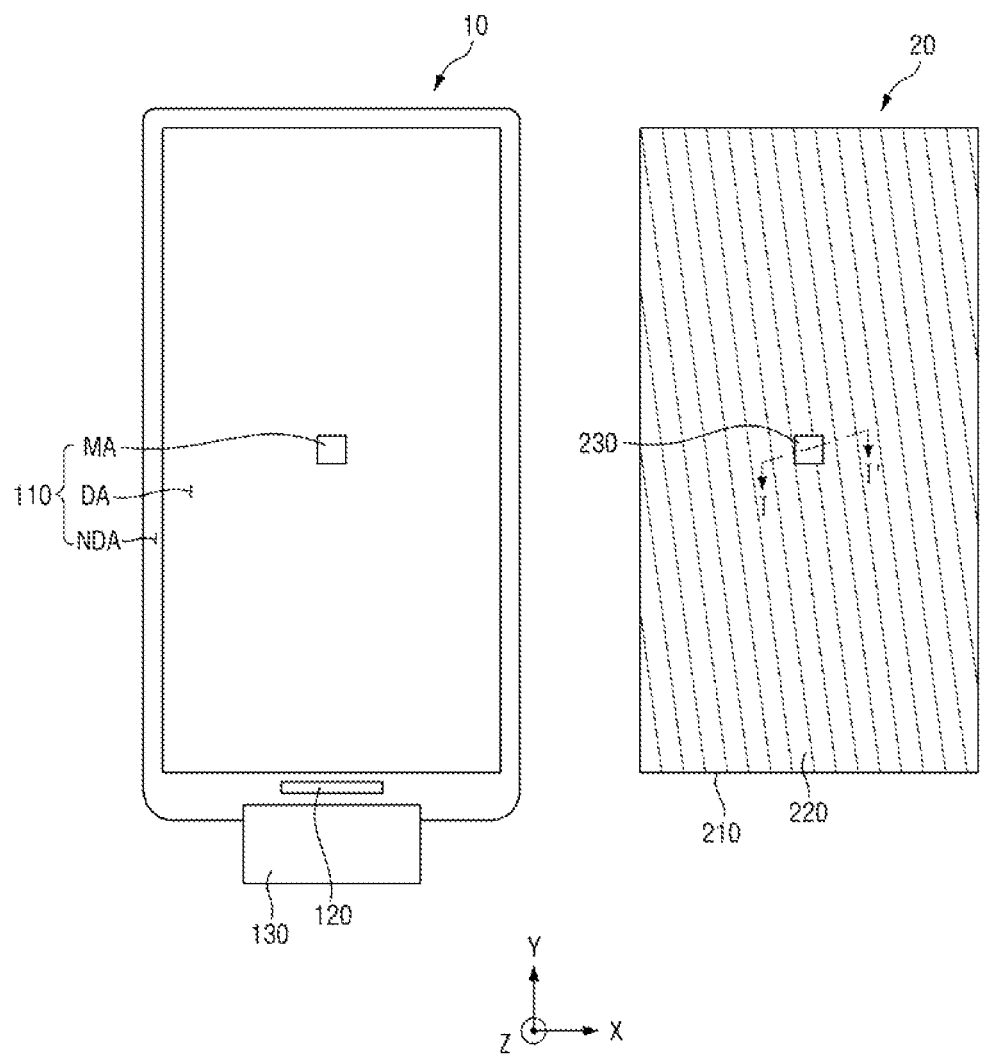
FIG. 2 is a plan view illustrating a display module and a stereoscopic lens of the display device according to an exemplary embodiment of the present inventive concepts.
Figure 6:
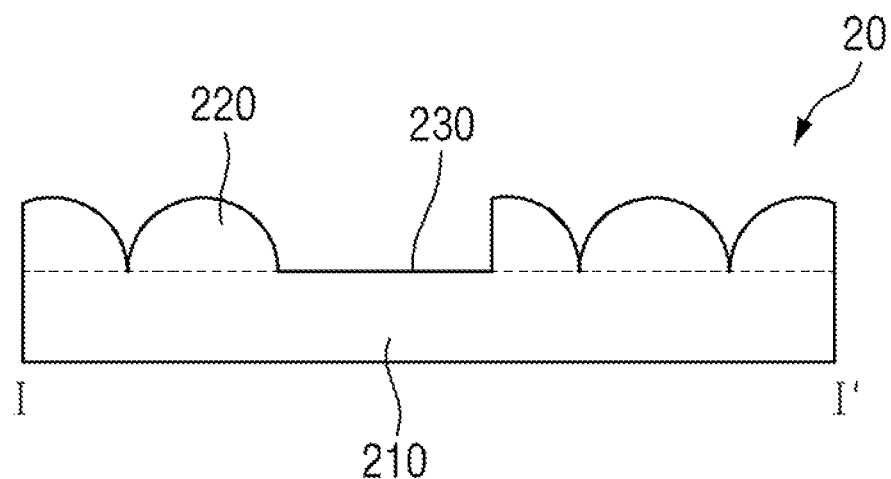
FIG. 6 is a cross-sectional view of the stereoscopic lens taken along the line I-I' of FIG. 2 according to an exemplary embodiment of the present inventive concepts.

FIG. 1 is an exploded perspective view of a display device according to an exemplary embodiment of the present inventive concepts, and FIG. 2 is a plan view illustrating a display module and a stereoscopic lens of the display device according to an exemplary embodiment of the present inventive concepts. FIG. 6 is a cross-sectional view of the stereoscopic lens taken along the line I-I' of FIG. 2.

Referring to the exemplary embodiments of FIGS. 1 and 2, a display device may be implemented as a flat panel display such as liquid crystal display (LCD), field emission display (FED), plasma display panel (PDP), or organic light emitting display (OLED). However, exemplary embodiments of the present inventive concepts are not limited thereto. For example, the display device may be a stereoscopic image display device including a display module 10 and a stereoscopic lens 20.

The display module 10 may include a display panel 110, a display driver 120, and a circuit board 130.

As shown in the exemplary embodiment of FIG. 1, the display panel 110 may include a display area DA, an alignment mark area MA positioned in the display area DA, and a non-display area NDA. The display area DA may include data lines, scan lines, voltage supply lines, and a plurality of pixels connected to the corresponding data lines, scan lines and voltage supply lines. For example, in an exemplary embodiment, the scan lines may extend in a first direction parallel to the X-axis (hereinafter, the "X direction") and be spaced apart from each other in a second direction parallel to the Y direction (hereinafter, the "Y direction"). In an exemplary embodiment, the data lines and the voltage supply lines may extend in the Y direction and may be spaced from each other in the X direction.

Each of the pixels may be connected to at least one scan line, at least one data line, and at least one voltage supply line. Each of the pixels may include thin film transistors including a driving transistor and at least one switching transistor, a light emitting element, and a capacitor. Each of the pixels may receive a data voltage of the data line DL when a scan signal is applied from the scan line, and may emit light by supplying a driving current to the light emitting element according to the data voltage applied to a gate electrode.

As shown in the exemplary embodiment of FIG. 1, the alignment mark area MA may be disposed in the display area DA. The alignment mark area MA may include a partial portion of pixels among a plurality of pixels in the display area DA capable of displaying an image. As shown in the exemplary embodiment of FIG. 1, the alignment mark area MA may be disposed at the center of the display area DA. However, exemplary embodiments of the present inventive concepts are not limited thereto and the alignment mark area MA may be disposed in any portion of the display area DA. The pixels in the alignment mark area MA may be driven during the process of bonding the display module 10 and the stereoscopic lens 20 and the light emitted by the driven pixels in the alignment mark area MA displays an alignment mark. For example, the display device may display an alignment mark using a partial portion of the pixels in the display area DA without using an alignment mark that is disposed outside the display area DA or not related to a displayed image. The display device may change and control the alignment mark by adjusting the driving of the partial portion of pixels by the display driver. The display device may form an alignment mark using at least some of the partial portion of the plurality of pixels of the display device that are disposed in the alignment mark area MA, thereby reducing the size of the alignment mark. Accordingly, a panel bonding system may have improved alignment precision by aligning the alignment mark formed using a partial portion of the pixels of the display module 10 with a flat portion 230 of the stereoscopic lens 20.

For example, in an exemplary embodiment, the alignment provided by the panel bonding system may reduce panel bonding time and cost based on the omission of a separate additional adjustment process after the bonding process. However, in another exemplary embodiment, the panel bonding system may maximize the alignment precision of the display module 10 and the stereoscopic lens 20 by performing an alignment process with improved precision and performing a separate adjustment process.

The non-display area NDA may surround the display area DA at the edge of the display panel 110. For example, as shown in the exemplary embodiment of FIG. 1, the non-display area NDA may surround (e.g., in the X and Y directions) all four sides of a rectangular-shaped display area DA. However, exemplary embodiments of the present inventive concepts are not limited thereto and the display area DA may have various different shapes in other exemplary embodiments. Additionally, in some exemplary embodiments, the display area DA may extend to at least one edge of the display module 10 and the non-display area NDA may not surround all sides of the display area DA. The non-display area NDA may include a scan driver applying scan signals to the scan lines, and pads connected to the circuit board 130. For example, in an exemplary embodiment, the display driver 120 may be disposed on one side of the non-display area NDA, and the pads may be disposed on one edge of the non-display area NDA on which the display driver 120 is disposed.

The display driver 120 may output signals and voltages for driving the display panel 110. The display driver 120 may supply data voltages to the data lines. The display driver 120 may supply a power voltage to the voltage supply line, and may supply scan control signals to the scan driver. For example, in an exemplary embodiment, the display driver 120 is formed as an integrated circuit (IC), and may be disposed in the non-display area NDA of the display panel 110 by a chip on glass (COG) method, a chip on plastic (COP) method, or an ultrasonic bonding method. However, exemplary embodiments of the present inventive concepts are not limited thereto. For example, in another exemplary embodiment, the display driver 120 may be mounted on the circuit board 130 and connected to the pads of the display panel 110.

In an exemplary embodiment, the circuit board 130 may be attached onto the pads of the display panel 110 using an anisotropic conductive film (ACF). The lead lines of the circuit board 130 may be electrically connected to the pads of the display panel 110. In an exemplary embodiment, the circuit board 300 may be a flexible printed circuit board (FPCB), a printed circuit board (PCB), or a flexible film such as a chip on film (COF). However, exemplary embodiments of the present inventive concepts are not limited thereto.

The stereoscopic lens 20 may be disposed on the display module 10. For example, the stereoscopic lens 20 may be attached to a front surface (e.g., an upper surface in the Z direction) of the display module 10 through an adhesive member. The stereoscopic lens 20 may be bonded to the display module 10 by a panel bonding apparatus. For example, in an exemplary embodiment, the stereoscopic lens 20 may be implemented as a lenticular lens sheet including a plurality of lenses 220. However, exemplary embodiments of the present inventive concepts are not limited thereto. For example, in another exemplary embodiment, the stereoscopic lens 20 may be implemented as a liquid crystal lens that forms lenses by controlling liquid crystals in a liquid crystal layer. As shown in the exemplary embodiments of FIGS. 1, 2 and 6, in exemplary embodiments in which the stereoscopic lens 20 is implemented as a lenticular lens sheet, the stereoscopic lens 20 may include a base 210, a plurality of lenses 220, and a flat portion 230.

As shown in the exemplary embodiment of FIGS. 1 and 6, the base 210 may be directly disposed on the front surface (e.g., the upper surface) of the display module 10 (e.g., in the Z direction). For example, a rear surface of the base 210 that faces the display module 10 and the front surface of the base 210 opposite to rear surface of the base 210 may be parallel to each other (e.g., in the X and Y directions) and spaced apart in the Z direction. The base 210 may output light incident from the display module 10. In an exemplary embodiment, the base 210 may not change the direction of the light. For example, the direction of light passing through the rear surface of the base 210 may be substantially the same as the direction of light passing through the front surface of the base 210. In an exemplary embodiment, the base 210 may be integrally formed with the plurality of lenses. However, exemplary embodiments of the present inventive concepts are not limited thereto.

The plurality of lenses 220 may be disposed on the base 210 to change the direction of light incident from the display module 10. The light incident from the display module 10 may pass through the base 210 to reach the plurality of lenses 220. The plurality of lenses 220 may be inclined from a first side of the display module 10. For example, the plurality of lenses 220 may be slanted lenses that are inclined by a predetermined angle with respect to a first side of each of the plurality of pixels of the display panel 110. For example, as shown in the exemplary embodiment of FIG. 1, a first side of the display module 10 may be the relatively longer side which extends substantially in the Y direction. The plurality of lenses may extend in a direction that is inclined from the Y direction by a predetermined angle. For example, the predetermined angle may be designed to prevent a color band of the display device from being viewed by a viewer.

The plurality of lenses 220 may be integrally formed with the base 210. For example, in an exemplary embodiment, the plurality of lenses 220 may be formed on the upper surface of the base 210 by embossing. However, exemplary embodiments of the present inventive concepts are not limited thereto. For example, in another exemplary embodiment, the plurality of lenses 220 may be manufactured separately from the base 210 and subsequently attached to the base 210. As shown in the exemplary embodiment of FIG. 1, the plurality of lenses 220 may be half-cylindrical lenses. However, exemplary embodiments of the present inventive concepts are not limited thereto. For example, in another exemplary embodiment, the plurality of lenses 220 may be implemented as Fresnel lenses.

The flat portion 230 may have a flat surface (e.g., extending in a plane defined in the X and Y directions) and is surrounded by the plurality of lenses 220. For example, the flat portion 230 may not include a lens of the plurality of lenses 220. For example, the flat portion 230 may be disposed at the center of the stereoscopic lens 20. The flat portion 230 may expose a portion of the front surface (e.g., an upper surface) of the base 210. The flat portion 230 may overlap (e.g., in the Z direction) the alignment mark area MA of the display panel 110. As shown in the exemplary embodiment of FIG. 6, the flat portion 230 disposed on the upper surface of the base 210 may be parallel to the lower surface of the base 210. Accordingly, the flat portion 230 may output light incident from the display module 10 without changing the direction of the light. For example, when the alignment mark area MA of the display panel 110 overlaps the plurality of lenses 220, the plurality of lenses 220 may change the direction of light forming an alignment mark, and alignment errors may occur in the process of aligning the display module 10 and the stereoscopic lens 20 using the panel bonding apparatus. Accordingly, in the display device, the flat portion 230 of the stereoscopic lens 20 may overlap the alignment mark area MA of the display module 10, thereby allowing the light forming the alignment mark to accurately reach a camera unit of the panel bonding apparatus.

In an exemplary embodiment, the flat portion 230 may be formed by removing a portion of at least one of the plurality of lenses 220. For example, the flat portion 230 may be formed by forming a plurality of lenses 220 and then cutting some of the plurality of lenses 220 and removing the cut portion. In an exemplary embodiment, the flat portion 230 may be cut using a milling process such as an end mill processing. However, exemplary embodiments of the present inventive concepts are not limited thereto. The flat portion 230 may have a rectangular shape in a plan view (e.g., in a plane defined by the X and Y direction). However, exemplary embodiments of the present inventive concepts are not limited thereto and the flat portion 230 may have a variety of different shapes, such as polygonal shapes, circular shapes, irregular shapes, etc. The flat portion 230 may be formed to correspond to the size of the alignment mark area MA which includes the partial portion of the plurality of pixels which are capable of forming the alignment mark. Further, the shape of the flat portion 230 may be changed according to the arrangement of the plurality of pixels capable of generating an alignment mark.

For example, a first side of the flat portion 230 may be inclined from the extending direction of the plurality of lenses 220. For example, as shown in the exemplary embodiment of FIG. 2, a first side of the flat portion 230 is parallel to the first side of the display module 10 and extends substantially in the Y direction which is inclined from the extending direction of the plurality of lenses 220. A second side of the flat portion 230 may be parallel to a second side of the display module 10 which is the relatively shorter side of the display module 10. For example, the second side of the flat portion 230 and the second side of the display module 10 (and a second side of the display area DA parallel thereto) may extend substantially in the X direction.

In another exemplary embodiment, the first side or the second side of the flat portion 230 may be parallel or perpendicular to the extending direction of the plurality of lenses 220. The flat portion 230 may be formed by cutting at least one of the plurality of lenses 220. In this exemplary embodiment, the width of the flat portion 230 may be the same as the width of at least one lens. However, exemplary embodiments of the present inventive concepts are not limited thereto.

For example, the shapes of the alignment mark area MA and the flat portion 230 are not limited to the shapes shown in FIGS. 1-2. The shapes of the alignment mark area MA and the flat portion 230 may be changed according to design conditions or needs, but the alignment function using the changed shapes may be maintained.

Figure 3:
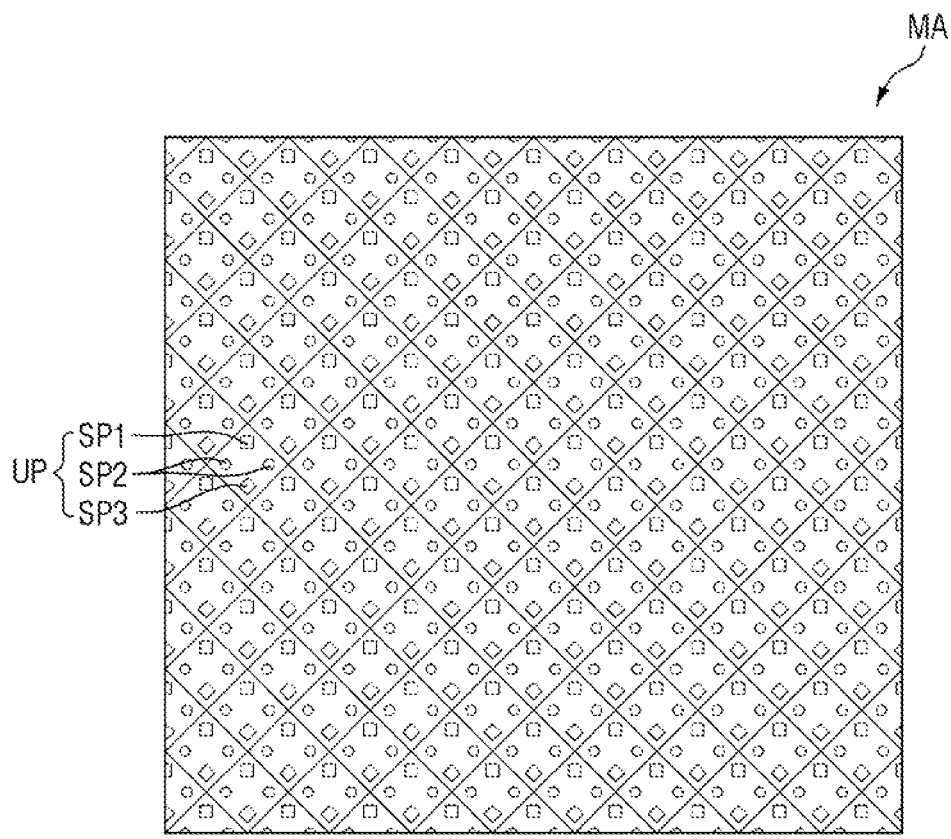
FIG. 3 is a plan view illustrating an alignment mark area of the display device according to an exemplary embodiment of the present inventive concepts.

FIG. 3 is a plan view illustrating an alignment mark area of the display device according to an exemplary embodiment of the present inventive concepts.

Referring to the exemplary embodiment of FIG. 3, the display area DA of the display panel 110 may include a plurality of unit pixels UP and a plurality of first to third sub-pixels SP1, SP2, and SP3. The plurality of the first to third sub-pixels SP1, SP2, and SP3 may be arranged along a plurality of rows and a plurality of columns. The number of unit pixels UP in the display area DA may increase as the resolution of the display device increases.

Each of the plurality of unit pixels UP may include first to third sub-pixels SP1, SP2, and SP3 which emit light having different colors. The plurality of first to third sub-pixels SP1, SP2, and SP3 may be provided by the intersection of n (n is a natural number) data lines and m (m is a natural number) scan lines. Each of the plurality of sub-pixels may include a light emitting element and a pixel circuit. The pixel circuit may include a driving transistor, at least one switching transistor, and at least one capacitor, and may drive a light emitting element of each of the plurality of sub-pixels.

As shown in the exemplary embodiment of FIG. 3, each of the plurality of unit pixels UP may include one first sub-pixel SP1, two second sub-pixels SP2, and one third sub-pixel SP3. However, exemplary embodiments of the present inventive concepts are not limited thereto. In an exemplary embodiment, the first sub-pixel SP1 may be a red sub-pixel, the second sub-pixel SP2 may be a green sub-pixel, and the third sub-pixel SP3 may be a blue sub-pixel. However, exemplary embodiments of the present inventive concepts are not limited thereto and the first to third sub-pixels SP1 to SP3 may be a various different colors. Additionally, in some exemplary embodiments, the numbers of the different sub-pixels may vary. The size of the opening of each of the first to third sub-pixels SP1, SP2, and SP3 may be determined according to the luminance of the corresponding light. Accordingly, the size of the opening of each of the first to third sub-pixels SP1, SP2, and SP3 may be adjusted to realize white light by mixing light emitted from each of the plurality of light emitting layers. Each of the first to third sub-pixels SP1, SP2, and SP3 may receive a data signal including gradation information of red, green, or blue light from the display driver 120 and output light of the corresponding color.

The alignment mark area MA may include a partial portion of the unit pixels among the plurality of unit pixels in the display area DA. At least some of the partial portion of the unit pixels UP in the alignment mark area MA may be driven by the display driver 120 to display an alignment mark. The display driver 120 may supply a scan signal and a data voltage to the partial portion of unit pixels UP displaying an alignment mark in the process of bonding the display module 10 and the stereoscopic lens 20. For example, in an exemplary embodiment, the alignment mark may have a cross shape. However, exemplary embodiments of the present inventive concepts are not limited thereto. For example, in other exemplary embodiments, the alignment mark may have a shape of any specific figure or symbol which is displayed by the driving of unit pixels UP in the alignment mark area MA by the display driver 120.

Figure 4:
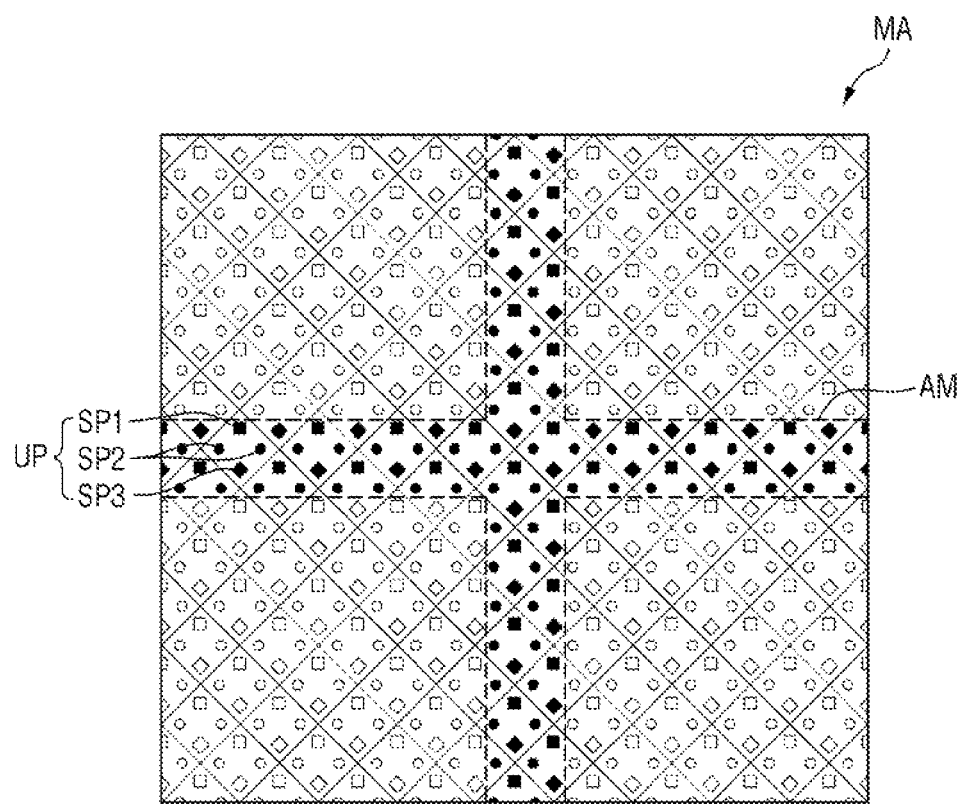
FIG. 4 is a plan view illustrating an example of an alignment mark in the display device according to an exemplary embodiment of the present inventive concepts.

FIG. 4 is a plan view illustrating an example of an alignment mark in the display device according to an exemplary embodiment of the present inventive concepts.

Referring to the exemplary embodiment of FIG. 4, the display driver 120 may form an alignment mark by driving the first to third sub pixels SP1, SP2, and SP3 arranged in at least one specific row in the alignment mark area MA and the first to third arranged in at least one specific column in the alignment mark area MA. For example, as shown in the exemplary embodiment of FIG. 4, the display driver 120 may drive the first sub-pixels SP1 arranged in two rows and two columns intersecting the two rows, drive the second sub-pixels SP2 arranged in two rows and two columns intersecting the two rows, and drive the third sub-pixels SP3 arranged in two rows and two columns intersecting the two rows to form a white alignment mark AM having a cross shape (+). In this exemplary embodiment, since the first and third sub-pixels SP1 and SP3 may be alternately arranged in the same row and the same column, the display driver 120 may drive the first to third sub-pixels SP1, SP2, and SP3 arranged in a total of four rows and four columns to form a white alignment mark AM having a cross shape (+).

For example, the size of the alignment mark AM may correspond to the size of predetermined pixels. As the number of the first to third sub-pixels SP1, SP2, and SP3 driven by the display driver 120 is reduced, the size of the alignment mark AM may be reduced. The display device may display an alignment mark AM using a partial portion of the pixels in the alignment mark area MA, thereby reducing the size of the alignment mark AM. As the size (e.g., area in the X and Y directions) of the alignment mark AM is reduced, the size (e.g., area in the X and Y directions) of the flat portion 230 corresponding to the size of the alignment mark AM may be reduced. When the size of the flat portion 230 is significantly reduced to such a degree that the flat portion 230 cannot be visually distinguished by a viewer, even if the flat portion 230 overlaps the display area DA of the display panel 110, image distortion due to the presence of the flat portion 230 and the absence of a lens of the plurality of lenses 220 in the flat portion 230 may not be visually recognized by the viewer. Further, as the sizes of the alignment mark AM and the flat portion 230 decrease, alignment precision may be improved. Therefore, the panel bonding system may improve alignment precision by aligning the alignment mark AM formed using a partial portion of the pixels of the display module 10 with the flat portion 230 of the stereoscopic lens 20.

For example, in an exemplary embodiment, the alignment provided by the panel bonding system may reduce panel bonding time and cost based on the omission of a separate additional adjustment process after the bonding process. However, in another example, the panel bonding system may maximize the alignment precision of the display module 10 and the stereoscopic lens 20 by performing an alignment process with improved precision and performing a separate adjustment process.

Figure 5:
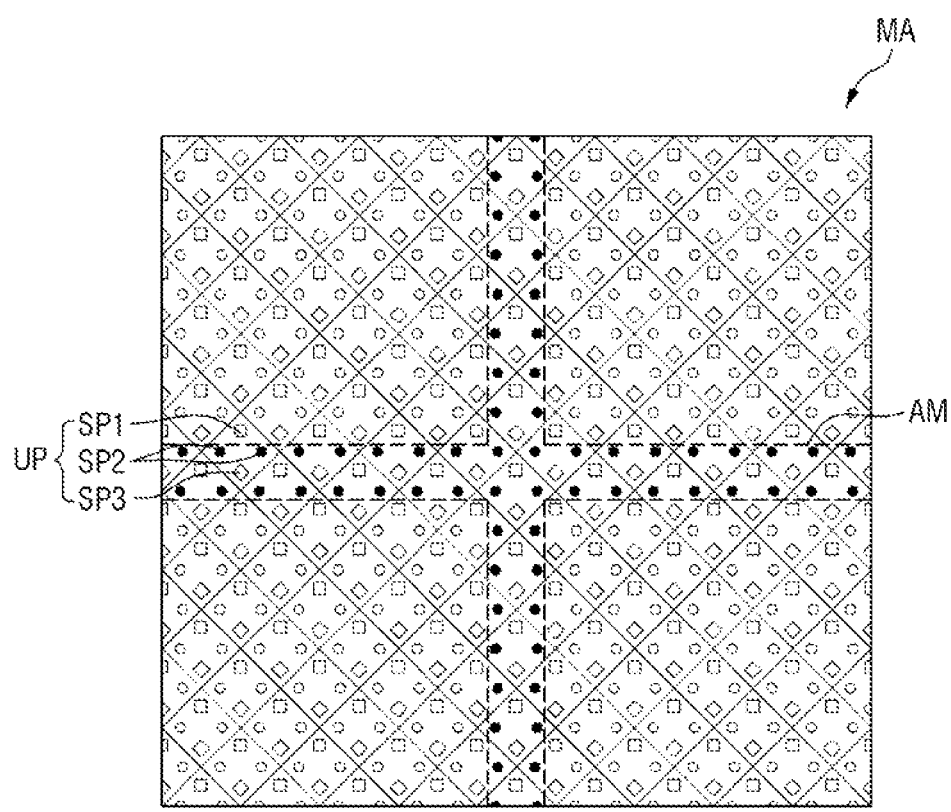
FIG. 5 is a plan view illustrating another example of an alignment mark in the display device according to an exemplary embodiment of the present inventive concepts.

FIG. 5 is a plan view illustrating another example of an alignment mark in the display device according to an exemplary embodiment of the present inventive concepts.

Referring to the exemplary embodiment of FIG. 5, the display driver 120 may form an alignment mark by driving specific types of sub-pixels among the first to third sub pixels SP1, SP2, and SP3 in the alignment mark area MA. For example, as shown in the exemplary embodiment of FIG. 5, the display driver 120 may drive the second sub-pixels SP2 arranged in two rows and two columns intersecting the two rows to form a green alignment mark AM having a cross shape (+). In another exemplary embodiment, the display driver 120 may drive the first sub-pixels SP1 arranged in two rows and two columns intersecting the two rows to form a red alignment mark AM having a cross shape (+). In another exemplary embodiment, the display driver 120 may drive the third sub-pixels SP3 arranged in two rows and two columns intersecting the two rows to form a blue alignment mark AM having a cross shape (+). However, in other exemplary embodiments, the display driver 120 may drive sub-pixels arranged in only one row and one column or may drive sub-pixels arranged in five or more rows and/or columns to display the alignment mark AM.

Accordingly, the panel bonding system may improve alignment precision by aligning the alignment mark AM formed using a partial portion of pixels of the display module 10 with the flat portion 230 of the stereoscopic lens 20. For example, the alignment provided by the panel bonding system may reduce panel bonding time and cost based on the omission of a separate additional adjustment process. However, in another example, the panel bonding system may maximize the alignment precision of the display module 10 and the stereoscopic lens 20 by performing an alignment process with improved precision and performing a separate adjustment process.

Figure 7:
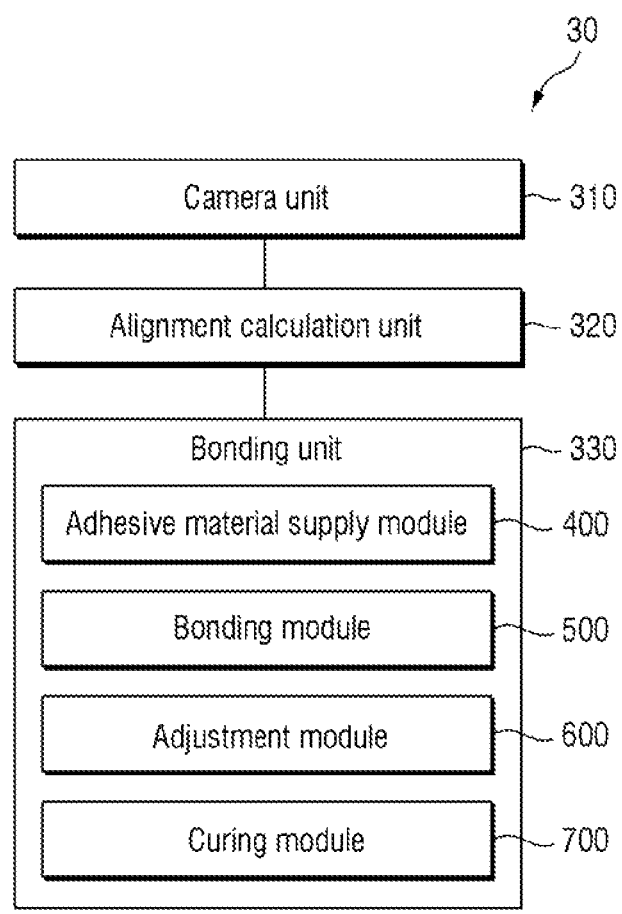
FIG. 7 is a block diagram illustrating a panel bonding apparatus of a panel bonding system according to an exemplary embodiment of the present inventive concepts.

FIG. 7 is a block diagram illustrating a panel bonding apparatus of a panel bonding system according to an exemplary embodiment of the present inventive concepts.

Referring to the exemplary embodiment of FIG. 7, a panel bonding apparatus 30 may include a camera unit 310, an alignment calculation unit 320, and a bonding unit 330.

The camera unit 310 may generate image data by photographing the alignment between the flat portion 230 of the stereoscopic lens 20 and the alignment mark AM displayed on the display module 10. The camera unit 310 may be disposed at one side of the bonding unit 330. For example, in an exemplary embodiment, the camera unit 310 may be disposed above the bonding unit 330 and may photograph the stereoscopic lens 20 and the display module 10 from above the stereoscopic lens 20 before bonding the display module 10 and the stereoscopic lens 20. However, exemplary embodiments of the present inventive concepts are not limited thereto and the camera unit 310 may be disposed at any position where the flat portion 230 of the stereoscopic lens 20 and the alignment mark AM of the display module 10 may be photographed. The camera unit 310 may supply image data concerning the alignment process to the alignment calculation unit 320.

The alignment calculation unit 320 may calculate a horizontal distance or a vertical distance for adjusting alignment based on the image data from the camera unit 310 to generate alignment data. For example, the alignment calculation unit 320 may calculate a distance between the stereoscopic lens 20 and the display module 10 based on the image data received from the camera unit 310. For example, the distance between the stereoscopic lens 20 and the display module 10 may correspond to a distance between the center of the flat portion 230 and the center of the alignment mark AM. The alignment calculation unit 320 may supply the alignment data to the bonding unit 330. The bonding unit 330 may then accurately align the display module 10 and the stereoscopic lens 20 based on the alignment data.

For example, the bonding unit 330 may move the stereoscopic lens 20 in the X direction or the Y direction based on the alignment data to align the stereoscopic lens 20 and the display module 10. For example, the bonding unit 330 may move the stereoscopic lens 20 in the X direction and/or Y direction to align the center of the flat portion 230 with the center of the alignment mark AM. The bonding unit 330 may complete alignment by attaching the stereoscopic lens 20 to the front surface (e.g., the upper surface) of the display module 10 provided with an adhesive member. The bonding unit 330 may adjust the position of the stereoscopic lens 20 until the position of the alignment mark AM of the display module 10 exactly coincides with the position of the flat portion 230 of the stereoscopic lens 20.

As shown in the exemplary embodiment of FIG. 7, the bonding unit 330 may include an adhesive material supply module 400, a bonding module 500 and a curing module 700. In an exemplary embodiment, the panel bonding apparatus 30 may bond the display module 10 and the stereoscopic lens 20 and may not include the process of adjusting by an adjustment module 600. For example, in an exemplary embodiment, the panel bonding apparatus 30 may not include an adjustment module 600. Therefore, the panel bonding apparatus 30 may improve alignment precision by aligning the alignment mark formed using a partial portion of the pixels of the display module 10 with the flat portion 230 of the stereoscopic lens 20. The panel bonding apparatus 30 may reduce panel bonding time and cost by omitting a separate additional adjustment process after the bonding process through alignment.

In another exemplary embodiment, the bonding unit 330 may further include an adjustment module 600. In this embodiment, the panel bonding apparatus 30 may further improve the alignment precision by the adjustment module 600 performing an adjustment procedure. Accordingly, the panel bonding system may maximize the alignment precision, and may reduce precise alignment time by efficiently using the bonding module 500 and the adjustment module 600.

The adhesive material supply module 400, the bonding module 500, the adjustment module 600, and the curing module 700 will be described in detail with reference to the exemplary embodiments of FIGS. 8, 9, 11, and 13, respectively.

Figure 8:
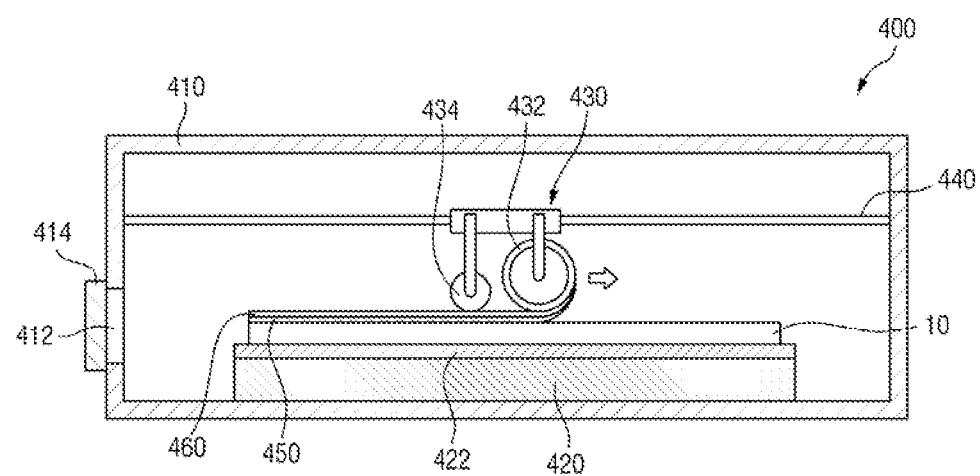
FIG. 8 is an elevational view illustrating an adhesive material supply module of the panel bonding apparatus according to an exemplary embodiment of the present inventive concepts.

FIG. 8 is an elevational view illustrating an adhesive material supply module of the panel bonding apparatus according to an exemplary embodiment of the present inventive concepts.

Referring to the exemplary embodiment of FIG. 8, in the adhesive material supply module 400, an adhesive member 450 may be deposited on and attached to a front surface of the display module 10. As shown in the exemplary embodiment of FIG. 8, the adhesive material supply module 400 may include an adhesion chamber 410, an adhesion stage 420, a moving unit 430, and a guide rail 440.

The adhesion chamber 410 may provide a space for attaching the adhesive member 450 on the display module 10. The adhesion chamber 410 may include an input port 412 and an input door 414. The display module 10 may be received inside the adhesion chamber 410 through the input port 412. When the preparation of the display module 10 and the adhesive member 450 is completed, the input door 414 may seal the adhesion chamber 410 to provide a space for depositing and attaching the adhesive member to the display module 10.

The adhesion stage 420 may be disposed on the bottom of the adhesion chamber 410 inside the adhesion chamber 410. The display module 10 may be disposed on a front surface (e.g., an upper surface) of the adhesion stage 420 to be supported by the adhesion stage 420. The adhesion stage 420 may have a fixing portion 422 that fixes the display module 10 to prevent the display module 10 from moving on the adhesion stage 420. In an exemplary embodiment, the fixing portion 422 may be implemented as an electrostatic chuck using an electrostatic force or a porous chuck using a vacuum adsorption force.

The moving unit 430 may reciprocate over the adhesion stage 420. The moving unit 430 may deposit the adhesive member 450 to the entire front surface of the display module 10 while reciprocating along the guide rail 440. The moving unit 430 may include a bobbin 432 and a pressing roller 434. The bobbin 432 is rotated by the reciprocating movement of the moving unit 430 to supply the adhesive member 450 wound on the adhesive surface of the display module 10 mounted on the adhesion stage 420. The pressing roller 434 may press the adhesive member 450 deposited onto the adhesive surface of the display module 10 to attached the adhesive member to the display module 10.

The bobbin 432 and the pressing roller 434 may attach a release member 460 to the front surface (e.g., an upper surface) of the adhesive member 450 opposite to the rear surface (e.g., a lower surface) of the adhesive member 450 facing the adhesive surface of the display module 10. The release member 460 may protect the adhesive force of the front surface of the adhesive member 450 in the process of attaching the rear surface of the adhesive member 450 to the adhesive surface of the display module 10. The release member 460 may be removed after the adhesive member 450 is attached to the display module 10, and the front surface of the adhesive member 450, from which the release member 460 was removed, may face the stereoscopic lens 20 in the bonding module 500.

The guide rail 440 may provide a path through which the moving unit 430 reciprocates. The guide rail 440 may extend from one lateral side surface of the adhesion chamber 410 to the opposite lateral side surface of the adhesion chamber. As shown in the exemplary embodiment of FIG. 8, the guide rail 440 may be disposed along a straight line, so that the moving unit 430 may attach the adhesive member 450 onto the display module 10 in one movement. However, exemplary embodiments of the present inventive concepts are not limited thereto.

Figure 9:
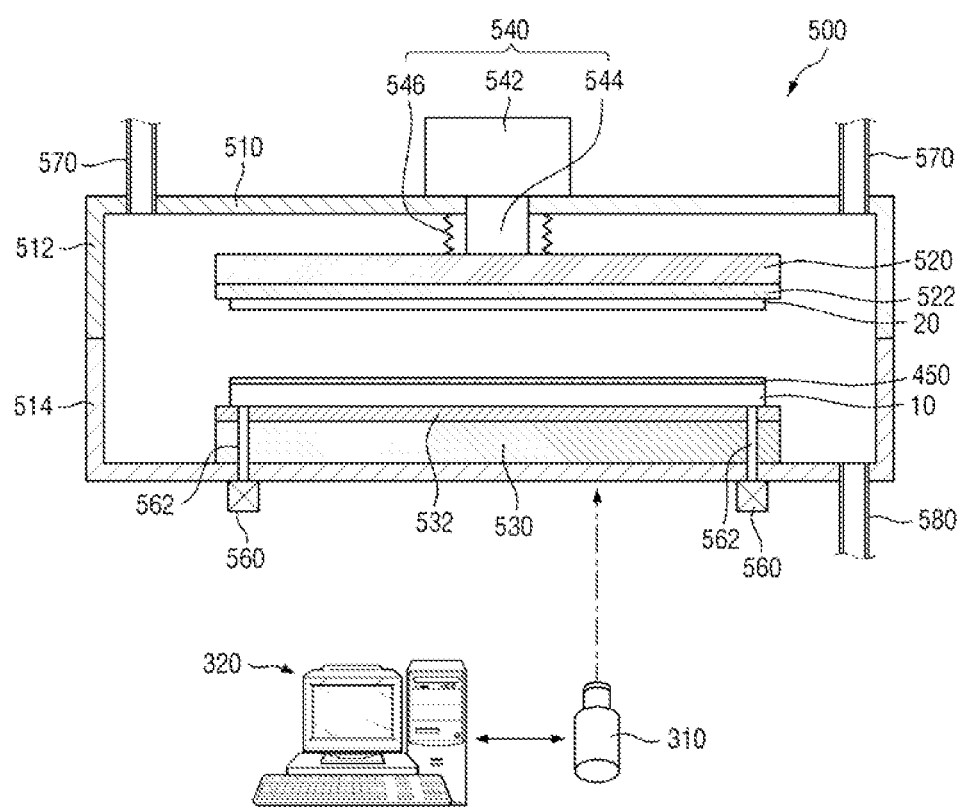
FIG. 9 is an elevational view illustrating a bonding module of the panel bonding apparatus according to an exemplary embodiment of the present inventive concepts.
Figure 10:
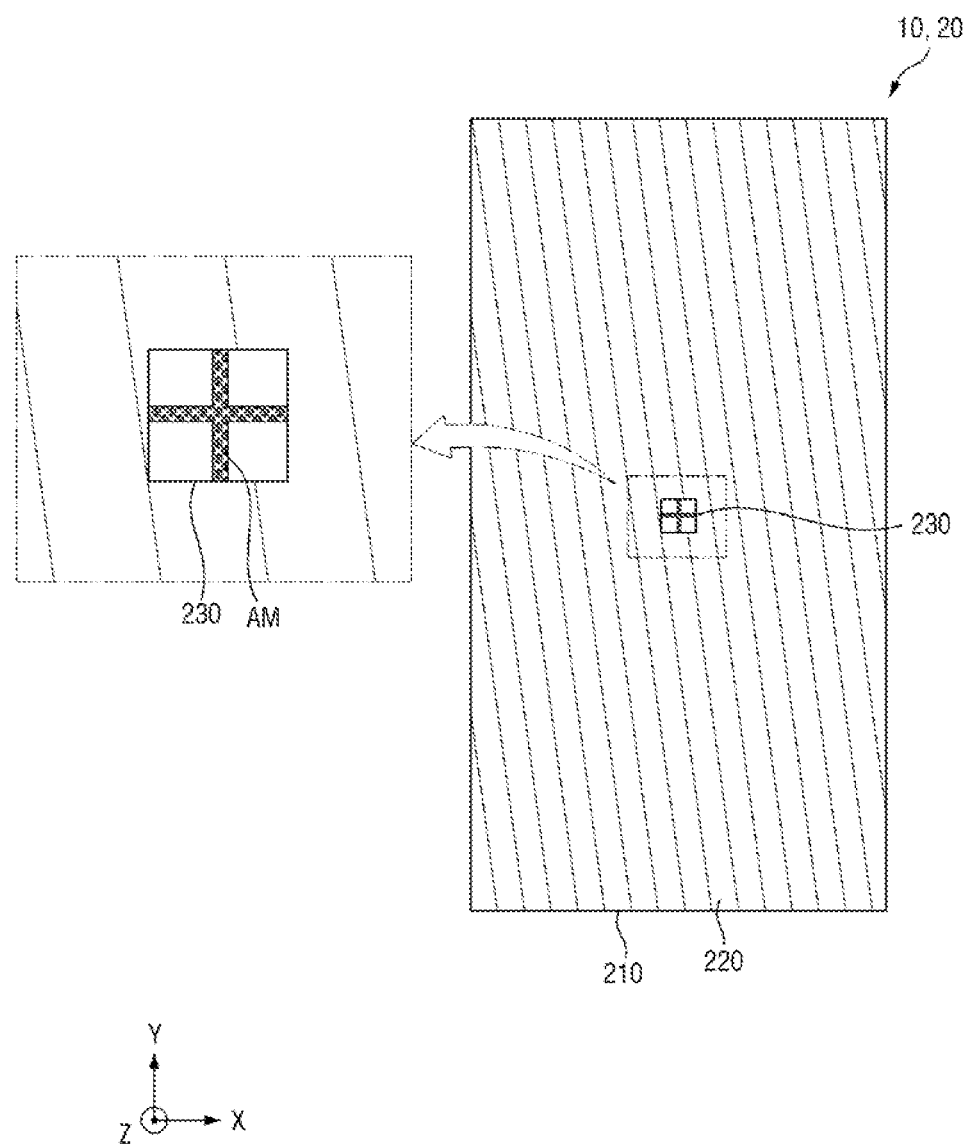
FIG. 10 is a plan view illustrating the alignment of an alignment mark and a flat portion in the panel bonding system according to an exemplary embodiment of the present inventive concepts.

FIG. 9 is an elevational view illustrating a bonding module of the panel bonding apparatus according to an exemplary embodiment of the present inventive concepts, and FIG. 10 is a plan view illustrating the alignment of an alignment mark and a flat portion in the panel bonding system according to an exemplary embodiment of the present inventive concepts.

Referring to the exemplary embodiments of FIGS. 9 and 10, the bonding module 500 may bond the front surface (e.g., an upper surface) of the display module 10 provided with the adhesive member 450 to the stereoscopic lens 20. The bonding module 500 may bond the display module 10 to the stereoscopic lens 20 by aligning the alignment mark AM of the display module 10 with the flat portion 230 of the stereoscopic lens 20 based on the alignment data received from the alignment calculation unit 320. While the alignment calculation unit 320 is shown in the exemplary embodiment of FIG. 10 as a separate personal computer PC, exemplary embodiments of the present inventive concepts are not limited thereto and the alignment calculation unit 320 may be implemented in various different forms.

The bonding module 500 may include a bonding chamber 510, an upper stage 520, a lower stage 530, and a lifting unit 540.

The bonding chamber 510 may provide a space for bonding the display module 10 and the stereoscopic lens 20 to each other. As shown in the exemplary embodiment of FIG. 9, the bonding chamber 510 may include a separable upper chamber 512 and a separable lower chamber 514. The upper chamber 512 and the lower chamber 514 may be separated before the bonding process is performed. The display module 10 may be secured to the lower stage 530 and the stereoscopic lens 20 may be secured to the upper stage 520. The upper chamber 512 and the lower chamber 514 may be separated after the bonding process is completed, and the bonded display device may be discharged.

The lifting unit 540 may lift the upper stage 520 up and down in a vertical direction at the inner upper portion of the bonding chamber 510. The upper stage 520 may be disposed at the inner upper portion of the upper chamber 512, and may be secured to the lifting unit 540 to be shifted up and down by the lifting unit 540. The rear surface (e.g., the lower surface) of the upper stage 520 may include a stereoscopic lens attachment portion 522 for securing the stereoscopic lens 20 thereto. For example, in an exemplary embodiment, the stereoscopic lens attachment portion 522 may be implemented as an electrostatic chuck using an electrostatic force or a porous chuck using a vacuum adsorption force to secure the stereoscopic lens 20 thereto. However, exemplary embodiments of the present inventive concepts are not limited thereto.

The lower stage 530 may be disposed at a position on the inner lower portion of the bonding chamber 510 that corresponds (e.g., overlaps in a vertical direction) to the position of the upper stage 520 on the inner upper portion of the bonding chamber 510. The lower stage 530 may be disposed at the inner lower portion of the lower chamber 514, and the upper surface of the lower stage 530 may include a display module attachment portion 532 for securing the display module 10 thereto. For example, in an exemplary embodiment, the display module attachment portion 532 may be implemented as an electrostatic chuck using an electrostatic force or a porous chuck using a vacuum adsorption force to secure the display module 10 thereto. However, exemplary embodiments of the present inventive concepts are not limited thereto.

The lifting unit 540 may lift the upper stage 520 up from the lower stage 530. The lifting unit 540 may be provided between a top surface of the upper chamber 512 and the upper stage 520 to move the upper stage 520 down toward the lower stage 530. As shown in the exemplary embodiment of FIG. 9, the lifting unit 540 may include a lifting actuator 542, a lifting shaft 544, and a bellows 546. The lifting actuator 542 may move up and down to lift the upper stage 520 up and down. The lifting shaft 544 may connect the lifting actuator 542 and the upper stage 520. The bellows 546 may be provided on the outer circumference of the lifting shaft 544 to maintain the vacuum or pressure difference in the bonding chamber 510 through volume change.

For example, the lifting unit 540 may be connected to an outer top surface of the upper stage 520 to move the upper stage 520 down toward the lower stage 530. However, exemplary embodiments of the present inventive concepts are not limited thereto. For example, in another exemplary embodiment, the lifting unit 540 may be connected to the lower stage 530 to lift the lower stage 530 up toward the upper stage 520.

The bonding module 500 may further include a lighting device 560, an exhaust pipe 570, and a supply pipe 580. The lighting device 560 may provide a light source for allowing the camera unit 310 to photograph the alignment mark AM of the display module 10 and the flat portion 230 of the stereoscopic lens 20. The lower stage 530 may further include a lighting hole 562 for the lighting device 560. As shown in the exemplary embodiment of FIG. 9, the lighting device 560 may be disposed on an exterior bottom portion of the lower chamber 514 and may be connected to the lighting hole 562 so that the light emitted by the lighting device 560 may travel through the lighting hole 562 towards the display module 10.

The exhaust pipe 570 and the supply pipe 580 may form a bonding environment in a bonding space inside the bonding chamber 510. When the display module 10 and the stereoscopic lens 20 are received in the bonding chamber 510, the exhaust pipe 570 may be connected to a pump to convert the bonding space to a vacuum state. When the display module 10 is in contact with the stereoscopic lens 20, the supply pipe 580 may be connected to a gas supply source to receive a process gas, and the process gas may pressurize the display module 10 or the stereoscopic lens 20. For example, the process gas may be nitrogen ($N_2$). However, exemplary embodiments of the present inventive concepts are not limited thereto.

Figure 11:
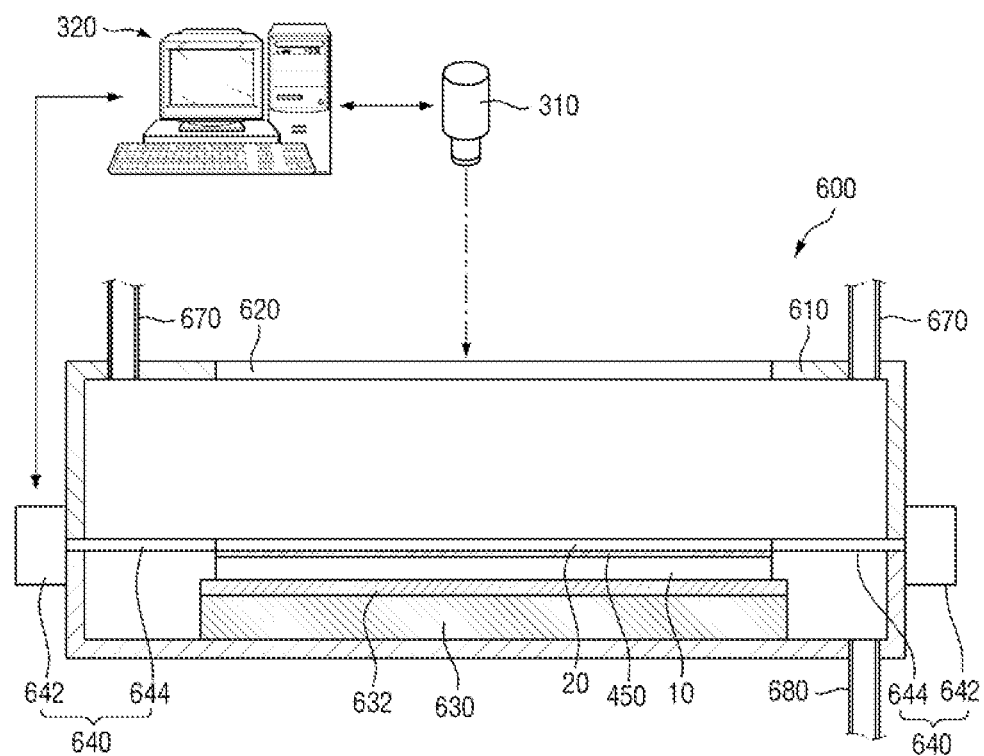
FIG. 11 is an elevational view illustrating an adjustment module of the panel bonding apparatus according to an exemplary embodiment of the present inventive concepts.
Figure 12:
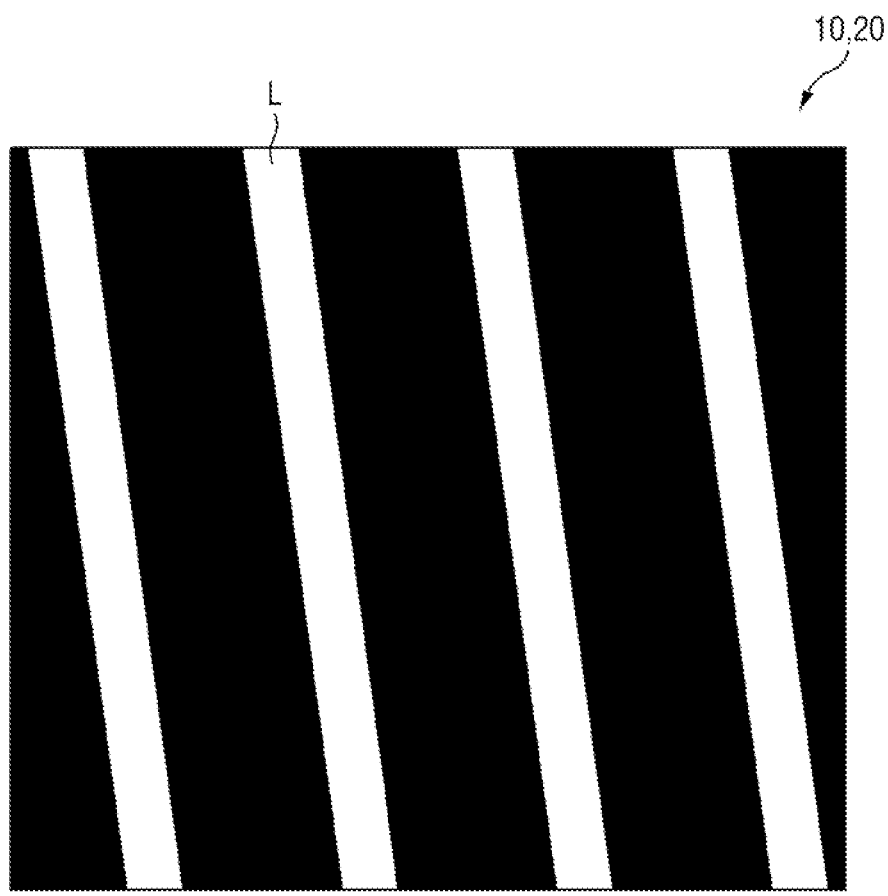
FIG. 12 is a plan view illustrating the light output of a display module in the panel bonding system according to an exemplary embodiment of the present inventive concepts.

FIG. 11 is an elevational view illustrating an adjustment module of the panel bonding apparatus according to an exemplary embodiment of the present inventive concepts, and FIG. 12 is a plan view illustrating the light output of a display module in the panel bonding system according to an exemplary embodiment of the present inventive concepts.

Referring to the exemplary embodiments of FIGS. 11 and 12, the adjustment module 600 may drive the display module 10 after the alignment of the display module 10 and the stereoscopic lens 20 is performed by the bonding module 500 to finely adjust the alignment of the display module 10 and the stereoscopic lens 20. For example, the adjustment module 600 may finely adjust the alignment of the display module 10 and the stereoscopic lens 20 until the light output L of the display module 10 having passed through the stereoscopic lens 20 has a clear line shape as shown in the exemplary embodiment of FIG. 12. When the display module 10 and the stereoscopic lens 20 are misaligned, the light output of the display device may have a blurry line shape or a distorted line shape. Accordingly, the panel bonding system may maximize the alignment precision between the display module 10 and the stereoscopic lens 20 by analyzing the light output of the display device after the alignment is performed by the bonding module 500.

As shown in the exemplary embodiment of FIG. 11, the adjustment module 600 may include an adjustment chamber 610, a window 620, an adjustment stage 630, and a position adjustment unit 640.

The adjustment chamber 610 may provide a space for finely adjusting the alignment of the display module 10 and the stereoscopic lens 20. For example, as shown in the exemplary embodiment of FIG. 11, the adjustment chamber 610 may be implemented as a separable upper chamber and a separable lower chamber, and thus the attached display device may be brought in and out of adjustment chamber 610. The display device may include the display module 10 and the stereoscopic lens 20 which are bonded by the adhesive member 450. However, exemplary embodiments of the present inventive concepts are not limited thereto. For example, in another exemplary embodiment, the window may be detached from the adjustment chamber 610, and thus the attached display device may be brought in and out of the adjustment chamber 610.

The window 620 may be provided at a portion of the upper surface of the adjustment chamber 610. The window 620 is disposed between the camera unit 310 and the screen of the display device to secure the field of view of the camera unit 310. The camera unit 310 may photograph the light output L of the display device through the window 620.

The adjustment stage 630 may be disposed at the inner lower portion of the adjustment chamber 610 to support the display device. The upper surface of the adjustment stage 630 may include a display device attachment portion 632 to secure the display device. For example, in an exemplary embodiment, the display device attachment portion 632 may be implemented as an electrostatic chuck using an electrostatic force or a porous chuck using a vacuum adsorption force for securing the display device.

The position adjustment unit 640 may finely move the position of the stereoscopic lens 20 in the X direction or the Y direction. For example, as shown in the exemplary embodiment of FIG. 11, the position adjustment unit 640 may be disposed on one lateral side surface of the adjustment chamber 610 and extend to the other lateral side surface of the adjustment chamber 160. However, exemplary embodiments of the present inventive concepts are not limited thereto. For example, in another exemplary embodiment, the position adjustment unit 640 may be disposed on all side surfaces of the adjustment chamber 610. As shown in the exemplary embodiment of FIG. 11, the position adjustment unit 640 may include a moving body 642 and a moving shaft 644. The moving body 642 may finely move the position of the stereoscopic lens 20 on a plane (e.g., a plane defined in the X and Y directions). The moving shaft 644 may connect the moving body 642 and the stereoscopic lens 20.

The adjustment module 600 may further include an exhaust pipe 670 and a supply pipe 680. The exhaust pipe 670 and the supply pipe 680 may form an adjustment environment in a space inside the adjustment chamber 610. When the display module 10 is received into the adjustment chamber 610, the exhaust pipe 670 may be connected to a pump to convert the bonding space to a vacuum state. When the fine adjustment of the alignment of the display device is performed, the supply pipe 680 may be connected to a gas supply source to receive a process gas, and the process gas may pressurize the display device.

Figure 13:
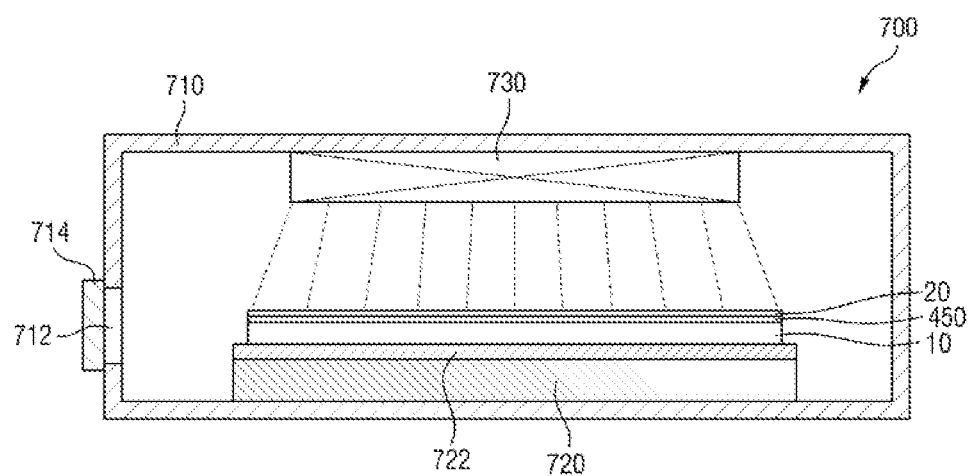
FIG. 13 is an elevational view illustrating a curing module of the panel bonding apparatus according to an exemplary embodiment of the present inventive concepts.

FIG. 13 is a view illustrating a curing module of the panel bonding apparatus according to an exemplary embodiment of the present inventive concepts.

Referring to the exemplary embodiment of FIG. 13, the curing module 700 may cure the adhesive member 450 disposed between the display module 10 and the stereoscopic lens 20. As shown in the exemplary embodiment of FIG. 13, the curing module 700 may include a curing chamber 710, a curing stage 720, and a curing machine 730.

The curing chamber 710 may provide a space for curing the adhesive member 450. The curing chamber 710 may include an input port 712 and an input door 714. The display device may be received inside the curing chamber 710 through the input port 712. When preparation for curing is completed, the input door 714 may seal the curing chamber 710 to provide a space for curing the adhesive member 450.

In an exemplary embodiment, the curing stage 720 may be disposed at the inner lower portion of the curing chamber 710. For example, the display device may be disposed on a front surface (e.g., an upper surface) of the curing stage 720 to be supported by the curing stage 720. The curing stage 720 may include a fixing portion 722 to prevent the display device from moving during the curing process. For example, in an exemplary embodiment, the fixing portion 722 may be an electrostatic chuck using an electrostatic force or a porous chuck using a vacuum adsorption force for fixing the display device. However, exemplary embodiments of the present inventive concepts are not limited thereto.

The curing machine 730 may apply light for curing the adhesive member 450 of the display device provided on the curing stage 720. For example, in an exemplary embodiment, the curing machine 730 may emit ultraviolet rays for curing the adhesive member 450 of the display device. However, exemplary embodiments of the present inventive concepts are not limited thereto. For example, in an exemplary embodiment, the curing machine 730 may be supported by a separate lifting device, and may be moved downwardly toward the curing stage 720 for application of the curing radiation. The distance between the curing machine 730 and the display device may be adjusted by the lifting device, and thus the curing machine 730 may adjust the degree of curing of the adhesive member 450.

Figure 14:
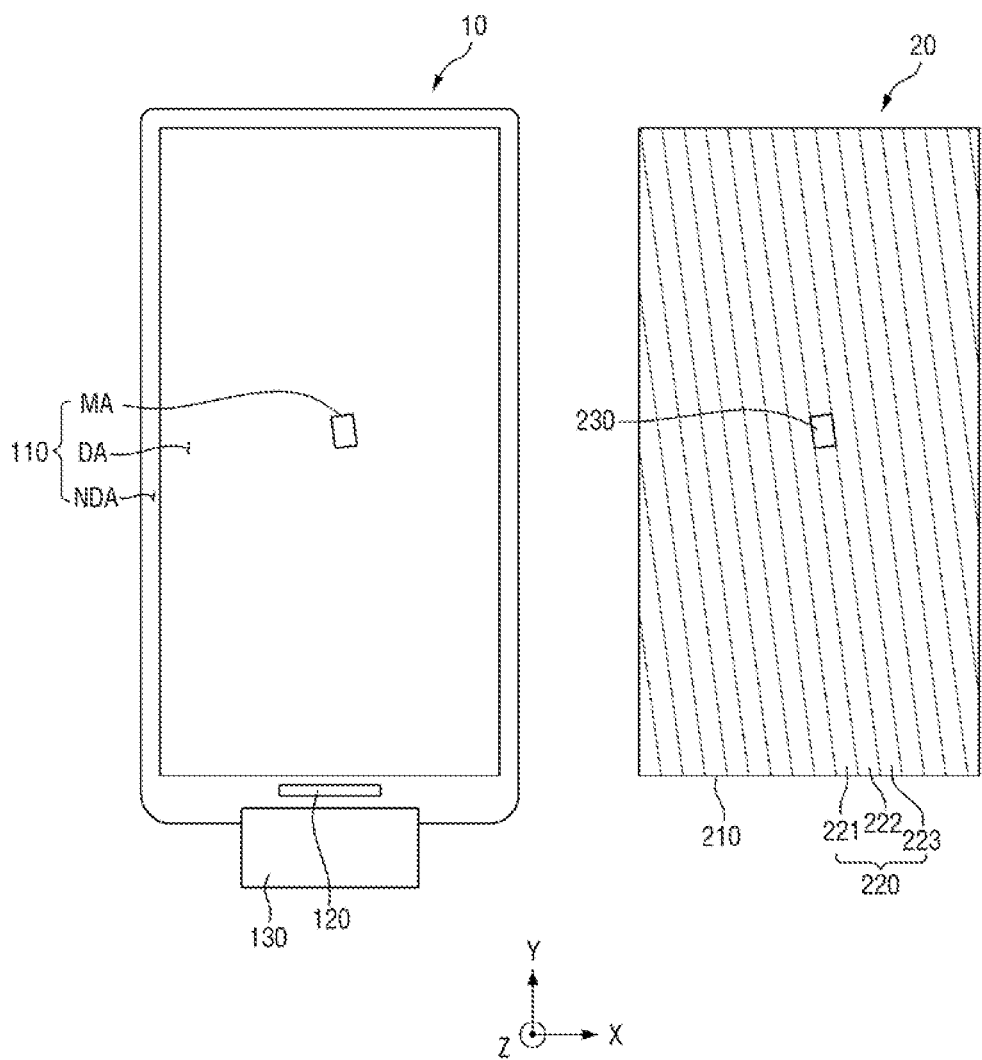
FIG. 14 is a plan view illustrating a display module and a stereoscopic lens of the display device according to another exemplary embodiment of the present inventive concepts.

FIG. 14 is a plan view illustrating a display module and a stereoscopic lens of the display device according to another exemplary embodiment of the present inventive concepts. The display device of FIG. 14 is different from the display device of FIG. 2 in the shapes of the alignment mark area MA and the flat portion 230. Configurations of elements that are identical to those described above will be briefly described or omitted for convenience of explanation.

Referring to the exemplary embodiment of FIG. 14, the display panel 110 may include a display area DA, an alignment mark area MA, and a non-display area NDA.

The alignment mark area MA maybe disposed in the display area DA. The alignment mark area MA may include a partial portion of pixels among the plurality of pixels in the display area DA capable of displaying an image. The pixels in the alignment mark area MA may be driven during the process of bonding the display module 10 and the stereoscopic lens 20 so that the light emitted by the driven pixels forms an alignment mark. The planar shape (e.g., in a plane defined in the X and Y directions) of the alignment mark area MA may correspond to the planar shape of the flat portion 230 of the stereoscopic lens 20. The alignment mark area MA may overlap the flat portion 230 in the Z direction which is a thickness direction of the display device.

The stereoscopic lens 20 may be disposed on the display module 10. In an exemplary embodiment in which the stereoscopic lens 20 is implemented as a lenticular lens sheet, the stereoscopic lens 20 may include a base 210, a plurality of lenses 220, and a flat portion 230.

The plurality of lenses 220 may be disposed on the base 210 to change the direction of light incident from the display module 10. The light incident from the display module 10 may pass through the base 210 without changing the direction of the light and the light may reach the plurality of lenses 220. The plurality of lenses 220 may be inclined from a first side of the display module 10. The plurality of lenses 220 may include first to third lenses 221, 222, and 223.

The flat portion 230 may have a flat surface surrounded by the plurality of lenses 220. For example, as shown in the exemplary embodiment of FIG. 14, the flat portion 230 may be disposed at the center of the stereoscopic lens 20 (e.g., a center portion in both the X and Y directions). The flat portion 230 may expose a part of the front surface of the base 210. The flat portion 230 may overlap the alignment mark area MA of the display panel 110 (e.g., in the Z direction).

In an exemplary embodiment, the flat portion 230 may be formed by removing a portion of at least one of the plurality of lenses 220. For example, the flat portion 230 may be formed by removing a partial portion of the second lens 222. In this embodiment, the flat portion 230 may be disposed between the first lens 221 and the third lens 223. A first side of the flat portion 230 may be parallel to the extending direction of the plurality of lenses 220, and the second side of the flat portion 230 may be perpendicular to both the first side of the flat portion 230 and the extending direction of the plurality of lenses 220. For example, as shown in the exemplary embodiment of FIG. 14, when the length of the first side of the flat portion 230 is different from the length of the second side of the flat portion 230 perpendicular to the first side of the flat portion 230, the first sides may be the relatively longer sides of the flat portion 230 which are parallel to the extending direction of the plurality of lenses 220. However, exemplary embodiments of the present inventive concepts are not limited thereto. For example, in another exemplary embodiment, when the length of the first side of the flat portion 230 is different from the length of the second side of the flat portion 230 perpendicular to the first side of the flat portion 230, the first side may be a relatively shorter side of the flat portion 230 which extend parallel to the extending direction of the plurality of lenses 220 and a relatively longer side of the flat portion 230 may be a second side which extends perpendicular to the extending direction of the plurality of lenses 220.

In another exemplary embodiment, the flat portion 230 may be formed by removing a first lens 221 and a third lens 223 adjacent thereto so that two second lenses 222 are disposed to be spaced apart from each other with the flat portion 230 therebetween.

Figure 15:
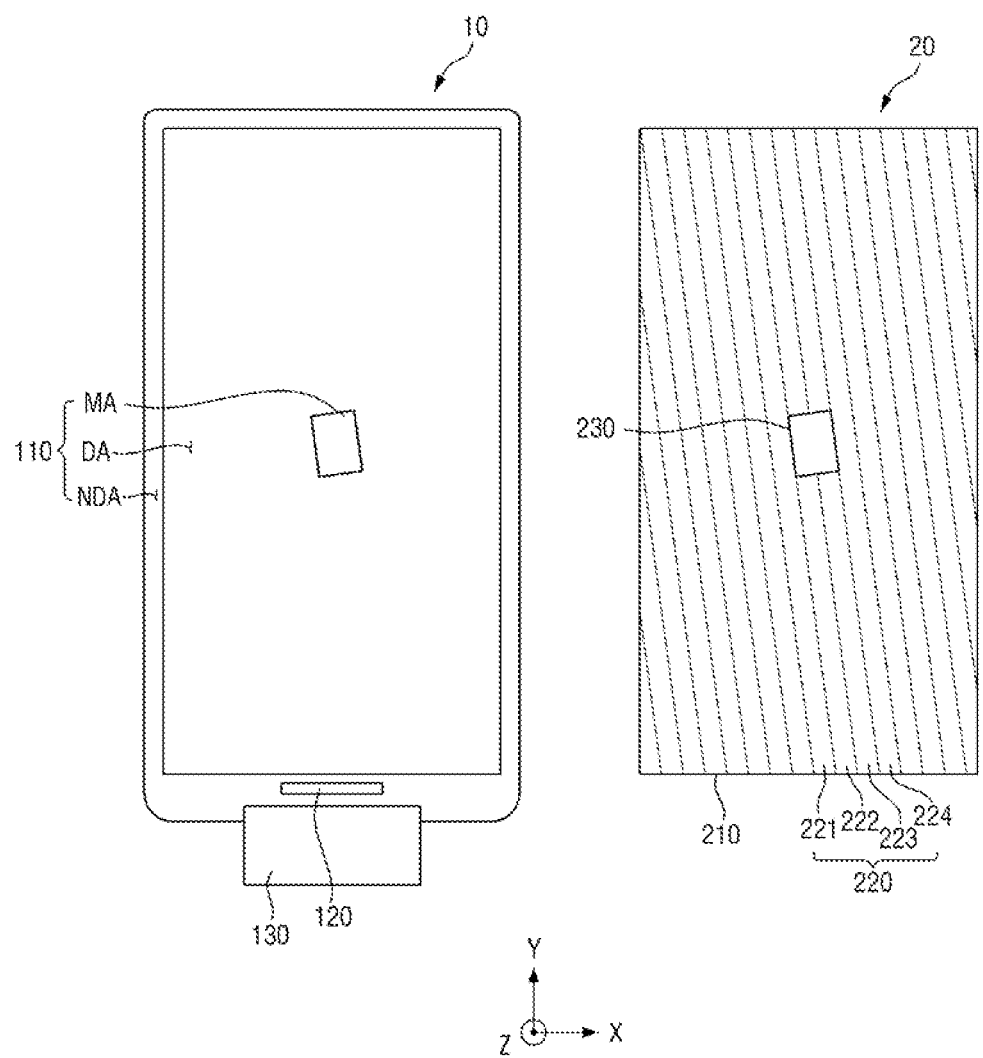
FIG. 15 is a plan view illustrating a display module and a stereoscopic lens of the display device according to another exemplary embodiment of the present inventive concepts.

FIG. 15 is a plan view illustrating a display module and a stereoscopic lens of the display device according to another exemplary embodiment of the present inventive concepts. The display device of the exemplary embodiment of FIG. 15 is different from the display device of the exemplary embodiments of FIGS. 2 and 14 based on the shapes of the alignment mark area MA and the flat portion 230. Configurations of elements that are identical to those described above will be briefly described or omitted.

Referring to the exemplary embodiment of FIG. 15, the display panel 110 may include a display area DA, an alignment mark area MA, and a non-display area NDA. The alignment mark area MA may be disposed in the display area DA. The planar shape (e.g., in a plane defined in the X and Y directions) of the alignment mark area MA may correspond to the planar shape of the flat portion 230 of the stereoscopic lens 20.

The stereoscopic lens 20 may be disposed on the display module 10. In an exemplary embodiment in which the stereoscopic lens 20 is implemented as a lenticular lens sheet, the stereoscopic lens 20 may include a base 210, a plurality of lenses 220, and a flat portion 230. The plurality of lenses 220 may include first to fourth lenses 221 to 224.

The flat portion 230 may have a flat surface surrounded by the plurality of lenses 220. For example, the flat portion 230 may be disposed at the center of the stereoscopic lens 20 (e.g., in a center portion in both the X and Y directions). The flat portion 230 may expose a part of the front surface (e.g., the upper surface) of the base 210. The flat portion 230 may overlap (e.g., in the Z direction) the alignment mark area MA of the display panel 110.

In an exemplary embodiment, the flat portion 230 may be formed by removing parts of the plurality of lenses 220. For example, the flat portion 230 may be formed by removing portions of second and third lenses 222 and 223 that are adjacent to each other. In this embodiment, the flat portion 230 may be disposed between the first lens 221 and the fourth lens 224. A first side of the flat portion 230 may be parallel to the extending direction of the plurality of lenses 220, and the second side of the flat portion 230 perpendicular to the first side of the flat portion 230 may be perpendicular to the extending direction of the plurality of lenses 220. For example, when the length of the first side of the flat portion 230 is different from the length of the second side of the flat portion 230 perpendicular to the first side of the flat portion 230, a relatively longer side of the flat portion 230 may be a first side which is parallel to the extending direction of the plurality of lenses 220. However, exemplary embodiments of the present inventive concepts are not limited thereto. For example, in another exemplary embodiment, when the length of the first side of the flat portion 230 is different from the length of the second side of the flat portion 230 perpendicular to the first side of the flat portion 230, the first side may be a relatively short side of the flat portion 230 which is parallel to the extending directions of the plurality of lenses 220 and the second side may be a relatively longer side of the flat portion 230 which extends perpendicular to the extending directions of the plurality of lenses 220.

In another exemplary, the flat portion 230 may be formed by arranging two second lenses 222 to be spaced apart from each other, arranging two third lenses 223 to be spaced apart from each other, arranging a second lens 222 and a first lens 221 to be spaced apart from each other, arranging a third lens 223 and a second lens 222 to be spaced apart from each other, etc.

Figure 16:
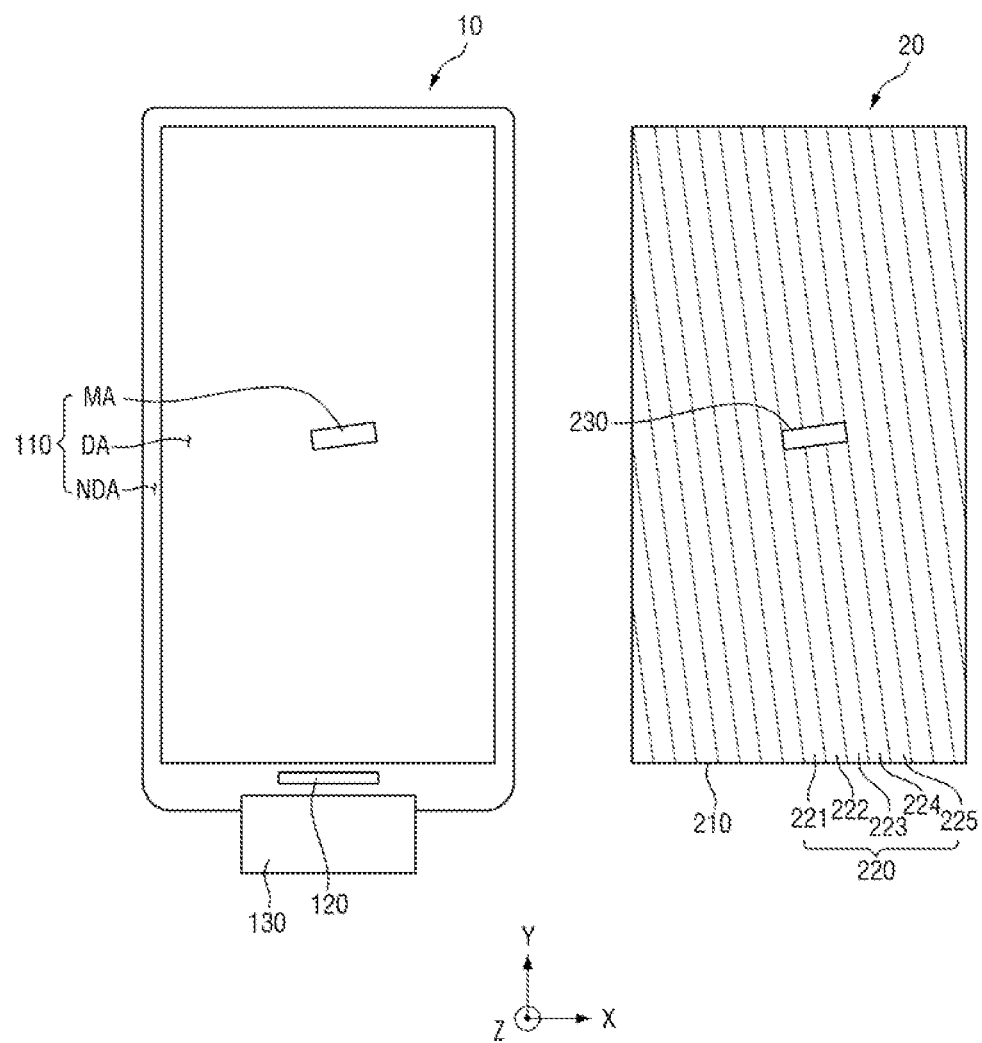
FIG. 16 is a plan view illustrating a display module and a stereoscopic lens of the display device according to another exemplary embodiment of the present inventive concepts.

FIG. 16 is a plan view illustrating a display module and a stereoscopic lens of the display device according to another exemplary embodiment of the present inventive concepts. The display device of the exemplary embodiment of FIG. 16 is different from the display device of the exemplary embodiments of FIGS. 2, 14, and 15 in the shapes of the alignment mark area MA and the flat portion 230. Configurations of elements that are identical to those described above will be briefly described or omitted for convenience of explanation.

Referring to the exemplary embodiment of FIG. 16, the display panel 110 may include a display area DA, an alignment mark area MA, and a non-display area NDA. The alignment mark area MA may be disposed in the display area DA. The planar shape (e.g., in a plane defined in the X and Y directions) of the alignment mark area MA may correspond to the planar shape of the flat portion 230 of the stereoscopic lens 20.

The stereoscopic lens 20 may be disposed on the display module 10. In an exemplary embodiment in which the stereoscopic lens 20 is implemented as a lenticular lens sheet, the stereoscopic lens 20 may include a base 210, a plurality of lenses 220, and a flat portion 230. The plurality of lenses 220 may include first to fifth lenses 221 to 225.

The flat portion 230 may have a flat surface surrounded by the plurality of lenses 220. For example, the flat portion 230 may be disposed at the center of the stereoscopic lens 20 (e.g., a center portion in both the X and Y directions). The flat portion 230 may expose a portion of the front surface (e.g., the upper surface) of the base 210. The flat portion 230 may overlap the alignment mark area MA of the display panel 110.

The flat portion 230 may be formed by removing a portion of the plurality of lenses 220. For example, the flat portion 230 may be formed by removing portions of the second to fourth lenses 222, 223, and 224. In this embodiment, the flat portion 230 may be disposed between the first lens 221 and the fifth lens 225. A first side of the flat portion 230 may be parallel to the extending direction of the plurality of lenses 220, and the second side of the flat portion 230 perpendicular to the first side of the flat portion 230 may be perpendicular to the extending direction of the plurality of lenses 220. For example, when the length of the first side of the flat portion 230 is different from the length of the second side of the flat portion 230 perpendicular to the first side of the flat portion 230, the first side may be a relatively longer side of the flat portion 230 which are parallel to the extending direction of the plurality of lenses 220. In another exemplary embodiment, as shown in FIG. 16, when the length of the first side of the flat portion 230 is different from the length of the second side of the flat portion 230 perpendicular to the first side of the flat portion 230, the first side may be a relatively shorter side of the flat portion 230 which is parallel to the extending directions of the plurality of lenses 220.

In another exemplary embodiment, the flat portion 230 may be formed by arranging two second lenses 222 to be spaced apart from each other, arranging two third lenses 223 to be spaced apart from each other, arranging two fourth lenses 224 to be spaced apart from each other or arranging two fifth lenses 225 to be spaced apart from each other. However, exemplary embodiments of the present inventive concepts are not limited thereto and the flat portion 230 may be arranged in various different manners with respect to the first to fifth lenses 221 to 225.

Figure 17:
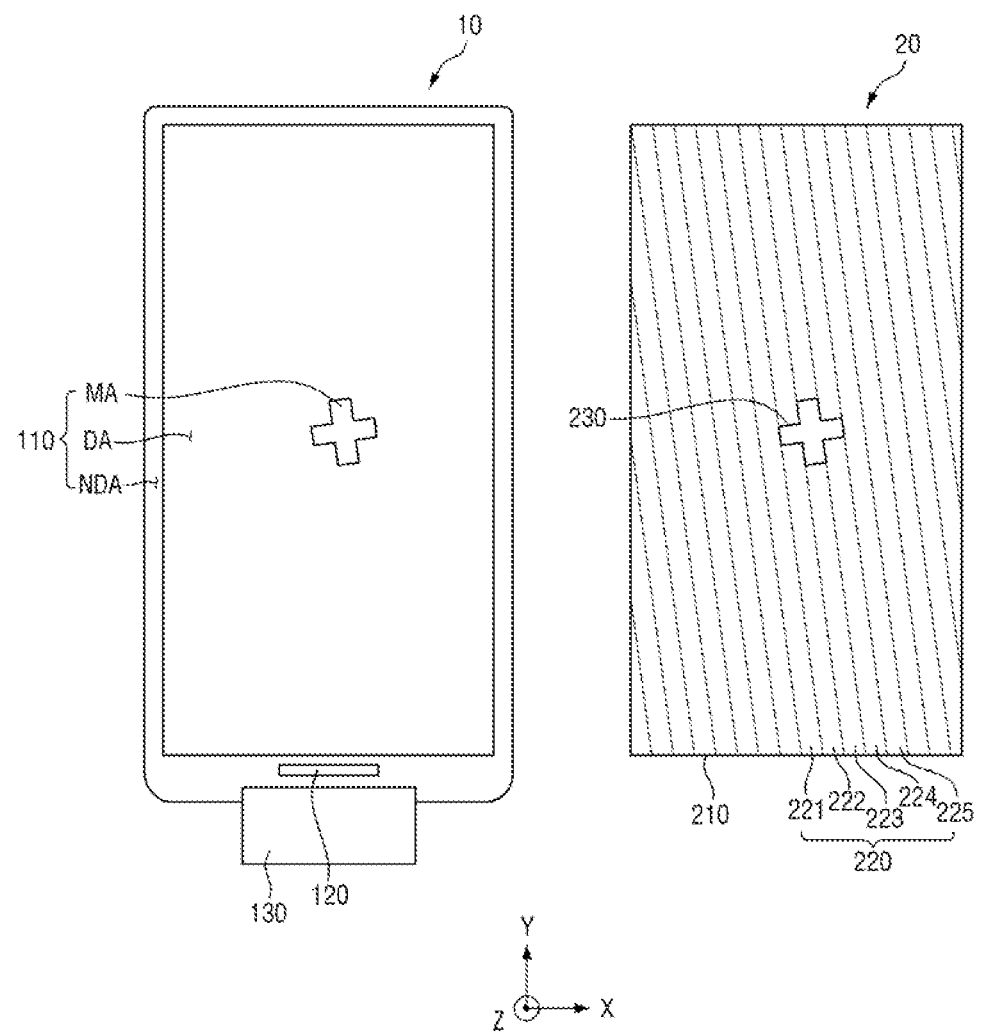
FIG. 17 is a plan view illustrating a display module and a stereoscopic lens of the display device according to another exemplary embodiment of the present inventive concepts.

FIG. 17 is a plan view illustrating a display module and a stereoscopic lens of the display device according to another exemplary embodiment of the present inventive concepts. The display device of FIG. 17 is different from the display devices of the exemplary embodiments of FIGS. 2, 14, 15, and 16 in the shapes of the alignment mark area MA and the flat portion 230. Configurations of elements that are identical to those described above will be briefly described or omitted for convenience of explanation.

Referring to the exemplary embodiment of FIG. 17, the display panel 110 may include a display area DA, an alignment mark area MA, and a non-display area NDA. The alignment mark area MA may be disposed in the display area DA. The planar shape (e.g., in a plane defined in the X and Y directions) of the alignment mark area MA may correspond to the planar shape of the flat portion 230 of the stereoscopic lens 20.

The stereoscopic lens 20 maybe disposed on the display module 10. In an exemplary embodiment in which the stereoscopic lens 20 is implemented as a lenticular lens sheet, the stereoscopic lens 20 may include a base 210, a plurality of lenses 220, and a flat portion 230. The plurality of lenses 220 may include first to fifth lenses 221 to 225.

The flat portion 230 may have a flat surface surrounded by the plurality of lenses 220. For example, the flat portion 230 may be disposed at the center of the stereoscopic lens 20 (e.g., in a center portion in both the X and Y directions). The flat portion 230 may expose a portion of the front surface (e.g., the upper surface) of the base 210. The flat portion 230 may overlap (e.g., in the Z direction) the alignment mark area MA of the display panel 110. For example, the flat portion 230 may have a cross shape (+).

The flat portion 230 may be formed by removing portions of the plurality of lenses 220. For example, the flat portion 230 may be formed by removing portions of the second and fourth lenses 222, 223, and 224. The removed portions of the second and fourth lenses 222, 223, and 224 may be different from each other. For example, the removed part of the third lens 223 may be larger than the removed part of the second or fourth lens 222 or 224. For example, the removed portions of the second and fourth lens 222 and 224 may be substantially identical to each other. In this embodiment, the flat portion 230 may be disposed between the first lens 221 and the fifth lens 225. However, in other exemplary embodiments, the flat portion 230 may be formed by removing various other portions of the first to fifth lenses 221 to 225.

Figure 18:
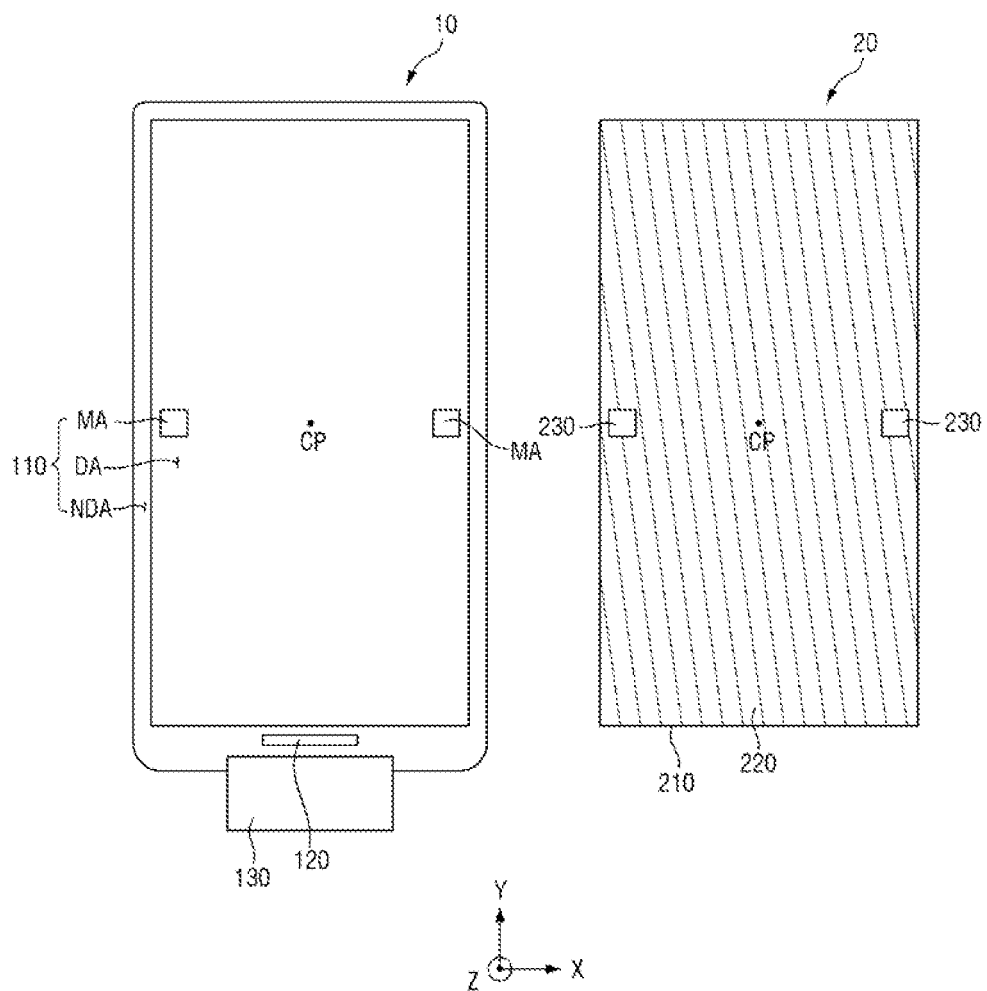
FIG. 18 is a plan view illustrating a display module and a stereoscopic lens of the display device according to another exemplary embodiment of the present inventive concepts.

FIG. 18 is a plan view illustrating a display module and a stereoscopic lens of the display device according to another exemplary embodiment of the present inventive concepts.

Referring to the exemplary embodiment of FIG. 18, the display panel 110 may include a display area DA, a plurality of alignment mark areas MA, and a non-display area NDA. As shown in the exemplary embodiment of FIG. 18, the plurality of alignment mark areas MA may be symmetrical with respect to the center point CP. For example, the plurality of alignment mark areas MA may include first and second alignment mark areas which are spaced apart from the center point an equal distance in the X direction and are substantially coplanar with the center point CP in the Y direction. The plurality of alignment marks MA may correspond (e.g., overlap in the Z direction) to the plurality of flat portions 230, respectively. For example, the display panel 110 may include first and second alignment mark areas MA, and the first and second alignment mark areas MA may be disposed on a line extending in the X direction via the center point CP.

The stereoscopic lens 20 may include a base 210, a plurality of lenses 220, and a plurality of flat portions 230. Each of the plurality of flat portions 230 may have a flat surface surrounded by the plurality of lenses 220. In an exemplary embodiment, the plurality of flat portions 230 may be symmetrical with respect to the center point CP. The plurality of flat portions 230 may correspond to the plurality of alignment mark areas MA, respectively. For example, the stereoscopic lens 20 may include first and second flat portions 230, and the first and second flat portions 230 may be disposed on a line extending in the X direction via the center point CP.

The panel bonding apparatus 30 may improve alignment precision by respectively aligning the alignment marks AM of the first and second alignment mark areas MA of the display module 10 with the first and second flat portions 230 of the stereoscopic lens 20. The display device may reduce the size of the alignment mark AM by forming an alignment mark AM using a partial portion of the pixels in the alignment mark area MA. Since the size of the alignment mark AM is reduced, the size of the flat portion 230 corresponding to the size of the alignment mark AM may be reduced. When the size of the flat portion 230 is significantly reduced to such a degree that the flat portion 230 cannot be visually distinguished by a viewer, even if the flat portion 230 overlaps the display area DA of the display panel 110, image distortion due to the presence of the flat portion 230 may not be visually recognized by the viewer. Further, as the sizes of the alignment mark AM and the flat portion 230 decrease, alignment precision may be improved. Therefore, the panel bonding system may improve alignment precision by aligning the alignment mark AM formed using a partial portion of the pixels of the display module 10 with the flat portion 230 of the stereoscopic lens 20.

For example, the alignment provided by the panel bonding system may reduce panel bonding time and cost by the omission of a separate additional adjustment process after the bonding process is performed. In another exemplary embodiment, the panel bonding system may maximize the alignment precision of the display module 10 and the stereoscopic lens 20 by performing an alignment process with improved precision and performing a separate adjustment process.

Figure 19:
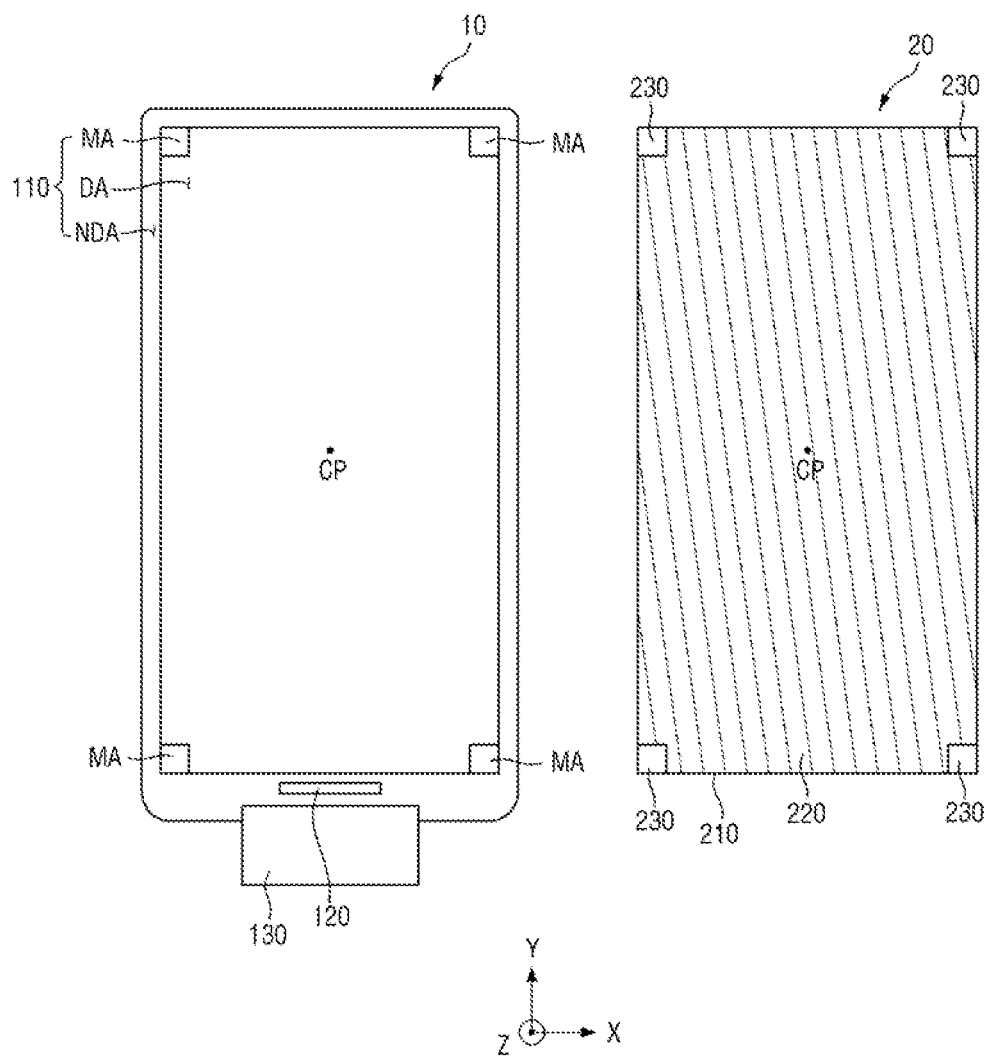
FIG. 19 is a plan view illustrating a display module and a stereoscopic lens of the display device according to another exemplary embodiment of the present inventive concepts.

FIG. 19 is a plan view illustrating a display module and a stereoscopic lens of the display device according to another exemplary embodiment of the present inventive concepts.

Referring to the exemplary embodiment of FIG. 19, the display panel 110 may include a display area DA, a plurality of alignment mark areas MA, and a non-display area NDA. The plurality of alignment mark areas MA may be symmetrical with respect to the center point CP. The plurality of alignment marks MA may correspond (e.g., overlap in the Z direction) to the plurality of flat portions 230, respectively. For example, the display panel 110 may include first to fourth alignment mark areas MA, and the first to fourth alignment mark areas MA may be disposed at four corners of the display area DA, respectively.

In an exemplary embodiment, the stereoscopic lens 20 may include a base 210, a plurality of lenses 220, and a plurality of flat portions 230. Each of the plurality of flat portions 230 may have a flat surface surrounded by the plurality of lenses 220. The plurality of flat portions 230 may be symmetrical with respect to the center point CP. For example, each of the flat portions 230 may be spaced apart from the center point CP an equal amount in the X and Y directions. The plurality of flat portions 230 may correspond to the plurality of alignment mark areas MA, respectively. For example, the stereoscopic lens 20 may include first to fourth flat portions 230, and the first to fourth flat portions 230 may be disposed at four corners of the display area DA, respectively.

Therefore, the panel bonding system may improve alignment precision by aligning the alignment mark AM formed using a partial portion of the pixels of the display module 10 with the flat portion 230 of the stereoscopic lens 20.

Figure 20:
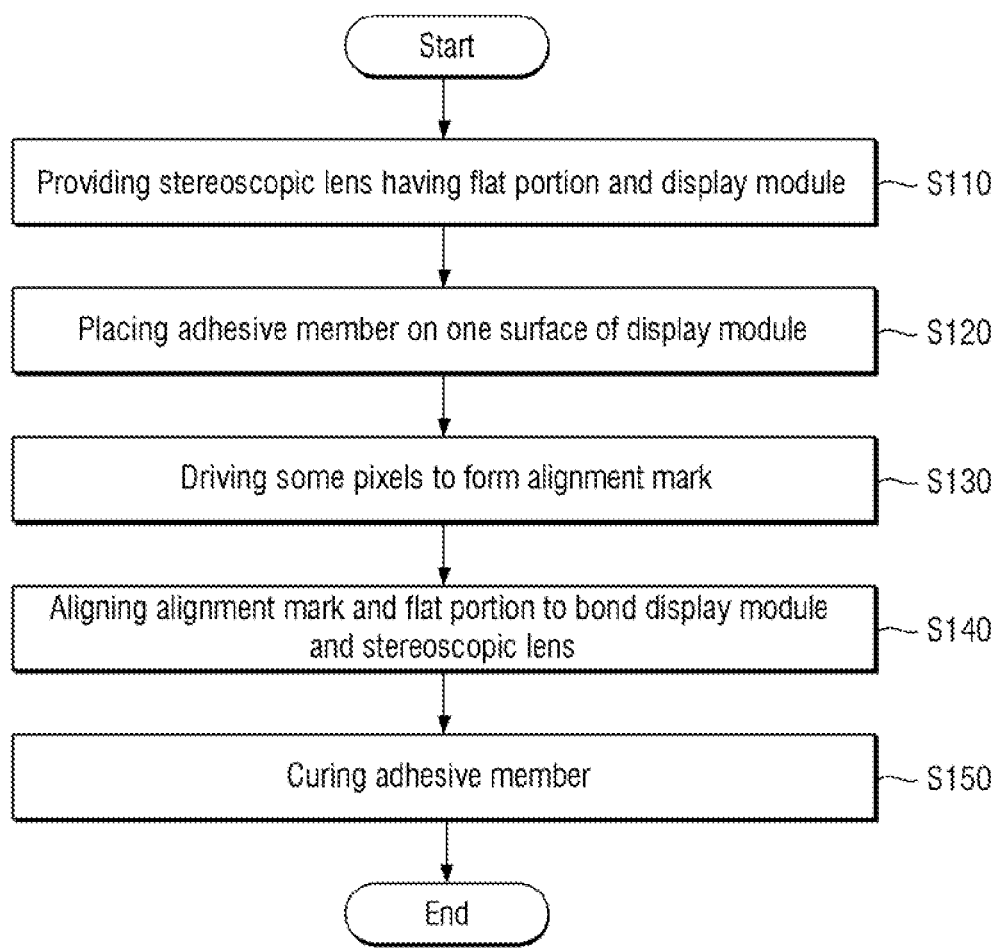
FIG. 20 is a flowchart illustrating a panel bonding process according to an exemplary embodiment of the present inventive concepts.

FIG. 20 is a flowchart illustrating a panel bonding process according to an exemplary embodiment of the present inventive concepts.

Referring to the exemplary embodiment of FIG. 20, the panel bonding apparatus 30 may include a camera unit 310, an alignment calculation unit 320, and a bonding unit 330. The bonding unit 330 may include an adhesive material supply module 400, a bonding module 500, and a curing module 700.

The panel bonding system may provide a display module 10 having an alignment mark area MA and a stereoscopic lens 20 having a flat portion 230 (step S110).

The adhesive material supply module 400 may provide the adhesive member 450 on a front surface (e.g., an upper surface) of the display module 10 (step S120). The adhesive material supply module 400 may attach a release member 460 to the front surface (e.g., an upper surface) of the adhesive member 450 opposite to the rear surface (e.g., a lower surface) of the adhesive member 450 facing the adhesive surface of the display module 10. The release member 460 may protect the adhesive force of the front surface of the adhesive member 450 in the process of attaching the rear surface of the adhesive member 450 to the adhesive surface of the display module 10.

The display driver 120 may form an alignment mark AM by driving a partial portion of the pixels in the alignment mark area MA in the process of bonding the display module 10 and the stereoscopic lens 20 (step S130).

The bonding module 500 may align the alignment mark AM and the flat portion 230 to bond the stereoscopic lens 20 to a front surface (e.g., an upper surface) of the display module 10 provided with the adhesive member 450 (step S140).

The curing module 700 may cure the adhesive member 450 disposed between the display module 10 and the stereoscopic lens 20 (step S150).

The display device may form an alignment mark using a partial portion of pixels in the display area DA without using an alignment mark that is disposed outside the display area DA or not related to a displayed image. The display device may form an alignment mark using a partial portion of pixels in the alignment mark area MA, thereby reducing the size of the alignment mark. Accordingly, the panel bonding system may improve alignment precision by aligning the alignment mark formed using a partial portion of pixels of the display module 10 with the flat portion 230 of the stereoscopic lens 20. The alignment provided by the panel bonding system may reduce panel bonding time and cost by omitting a separate additional adjustment process after the bonding process.

FIG. 21 is a flowchart illustrating a panel bonding process according to another exemplary embodiment of the present inventive concepts.

Referring to the exemplary embodiment of FIG. 21, the panel bonding apparatus 30 may include a camera unit 310, an alignment calculation unit 320, and a bonding unit 330. The bonding unit 330 may include an adhesive material supply module 400, a bonding module 500, an adjustment module 600, and a curing module 700.

The panel bonding system may provide a display module 10 having an alignment mark area MA and a stereoscopic lens 20 having a flat portion 230 (step S210).

The adhesive material supply module 400 may provide the adhesive member 450 on a front surface (e.g., an upper surface) of the display module 10 (step S220). The adhesive material supply module 400 may attach a release member 460 to the front surface (e.g., an upper surface) of the adhesive member 450 opposite to the rear surface (e.g., a lower surface) of the adhesive member 450 facing the adhesive surface of the display module 10. The release member 460 may protect the adhesive force of the front surface of the adhesive member 450 in the process of attaching the rear surface of the adhesive member 450 to the adhesive surface of the display module 10.

The display driver 120 may form an alignment mark AM by driving a partial portion of pixels in the alignment mark area MA in the process of bonding the display module 10 and the stereoscopic lens 20 (step S230).

The bonding module 500 my align the alignment mark AM and the flat portion 230 to bond the stereoscopic lens 20 to a front surface of the display module 10 provided with the adhesive member 450 (step S240).

The adjustment module 600 may finely adjust the alignment of the display module 10 and the stereoscopic lens 20 by driving the display module 10 after the alignment of the display module 10 and the stereoscopic lens 20 is adjusted by the bonding module 500 (step S250). The adjustment module 600 may finely adjust the alignment of the display module 10 and the stereoscopic lens 20 until the light output L of the display module 10 having passed through the stereoscopic lens 20 has a clear line shape as shown in the exemplary embodiment of FIG. 12.

The curing module 700 may cure the adhesive member 450 between the display module 10 and the stereoscopic lens 20 (step S260).

Therefore, the panel bonding system may maximize alignment precision of the display module 10 and the stereoscopic lens 20 by analyzing the light output of the display device.

According to a display device according to exemplary embodiments and a panel bonding system including the display device, a display driver may form an alignment mark by driving pixels in an alignment mark area in the process of bonding a display module and a stereoscopic lens. The display device may reduce the size of the alignment mark by forming the alignment mark using a partial portion of pixels in the alignment mark area. Therefore, the panel bonding system may improve alignment precision by aligning the alignment mark using a partial portion of pixels of the display module with the flat portion of the stereoscopic lens.

The effects of the present invention are not limited by the foregoing, and other various effects are anticipated herein.

Although some exemplary embodiments of the present inventive concepts have been disclosed for illustrative purposes, exemplary embodiments of the present inventive concepts are not limited thereto and those skilled in the art will appreciate that various modifications, additions and substitutions are possible, without departing from the scope and spirit of the inventive concepts.

What is claimed is:

1. A display device, comprising:
   a display module including a display panel having a plurality of pixels and a display driver configured to drive a partial portion of the plurality of pixels that are positioned in an alignment mark area to display an alignment mark in the alignment mark area; and
   a stereoscopic lens including a base disposed on the display module, a plurality of lenses disposed on the base, and at least one flat portion surrounded by the plurality of lenses and overlapping the alignment mark area,
   wherein the plurality of lenses are inclined from a first side of the display module; and
   a first side of the at least one flat portion is inclined from an extending direction of the plurality of lenses.

2. The display device of claim 1, wherein the at least one flat portion exposes a portion of an upper surface of the base.

3. The display device of claim 1, wherein:
   the plurality of lenses are inclined from a first side of the display module; and
   a first side of the at least one flat portion is parallel or perpendicular to an extending direction of the plurality of lenses.

4. The display device of claim 1, wherein the at least one flat portion includes one flat portion disposed at a center of the stereoscopic lens.

5. The display device of claim 1, wherein the at least one flat portion includes a plurality of flat portions that are symmetrical to each other with respect to a center point of the stereoscopic lens.

6. A display device, comprising:
   a display module including a display panel having a plurality of pixels and a display driver configured to drive a partial portion of the plurality of pixels that are positioned in an alignment mark area to display an alignment mark in the alignment mark area; and
   a stereoscopic lens including a plurality of lenses, and at least one flat portion surrounded by the plurality of lenses, the at least one flat portion overlapping the alignment mark area,
   wherein the plurality of lenses are inclined from a first side of the display module; and
   a first side of the at least one flat portion is inclined from an extending direction of the plurality of lenses.

7. The display device of claim 1, wherein the alignment mark has a predetermined identifiable shape to align the display module and the stereoscopic lens with each other.

8. The display device of claim 6, wherein the alignment mark has a predetermined identifiable shape to align the display module and the stereoscopic lens with each other.

9. A panel bonding system, comprising: a display module including a display panel having a plurality of pixels and a display driver configured to drive a partial portion of the plurality of pixels that are positioned in an alignment mark area to display an alignment mark in the alignment mark area; and a stereoscopic lens including a base disposed on the display module, a plurality of lenses disposed on the base, and at least one flat portion surrounded by the plurality of lenses and overlapping the alignment mark area; and wherein, the plurality of lenses are inclined from a first side of the display module and a first side of the at least one flat portion is inclined from an extending direction of the plurality of lenses; and a panel bonding apparatus configured to align the at least one flat portion and the alignment mark displayed by the partial portion of the plurality of pixels to bond the display module and the stereoscopic lens.

10. The panel bonding system of claim 9, wherein the display panel comprises:

a display area including the plurality of pixels; and the alignment mark area is disposed in the display area.

11. The panel bonding system of claim 10, wherein the display module is configured to display the alignment mark by driving pixels arranged in at least one predetermined row and pixels arranged in at least one predetermined column intersecting the at least one predetermined row among the partial portion of the plurality of pixels that are positioned in the alignment mark area.

12. The panel bonding system of claim 10, wherein:

the plurality of pixels includes a plurality of unit pixels each including first to third sub-pixels; and the display module is configured to display the alignment mark by emitting light from unit pixels arranged in at least one predetermined row and unit pixels arranged in at least one predetermined column intersecting the at least one predetermined row among the partial portion of the plurality of pixels that are positioned in the alignment mark area.

13. The panel bonding system of claim 10, wherein:

the plurality of pixels includes a plurality of first to third sub-pixels; and the display module is configured to display the alignment mark by emitting light from first sub-pixels arranged in at least one predetermined row and first sub-pixels arranged in at least predetermined column intersecting the at least one predetermined row among the partial portion of the plurality of pixels that are positioned in the alignment mark area.

14. The panel bonding system of claim 9, wherein the panel bonding apparatus comprises:

a camera unit configured to photograph an alignment of the at least one flat portion and the alignment mark to generate image data;

an alignment calculation unit configured to calculate a horizontal distance and vertical distance for alignment adjustment based on the image data to generate alignment data; and a bonding unit configured to bond the display module and the stereoscopic lens based on the alignment data.

15. The panel bonding system of claim 14, wherein the bonding unit comprises:

an adhesive material supply module configured to deposit and attach an adhesive member between the display module and the stereoscopic lens;

a bonding module configured to attach the display module and the stereoscopic lens to each other using the adhesive member and adjust the alignment of the display module and the stereoscopic lens based on the alignment data; and a curing module configured to irradiate the adhesive member with light to cure the adhesive member.

16. The panel bonding system of claim 15, wherein the bonding unit further comprises:

an adjustment module configured to drive the display module after the alignment of the display module and the stereoscopic lens is performed by the bonding module, the adjustment module further configured to finely adjust the alignment of the display module and the stereoscopic lens.

17. The panel bonding system of claim 16, wherein the adjustment module is configured to finely adjust the alignment of the display module and the stereoscopic lens based on a degree of clearness of light that is emitted from the display module, passes through the stereoscopic lens and reaches a specific field of view.

18. The panel bonding system of claim 9, wherein the at least one flat portion exposes a portion of an upper surface of the base.

19. The panel bonding system of claim 9, wherein:

the plurality of lenses are inclined from a first side of the display module; and a first side of the at least one flat portion is parallel or perpendicular to an extending direction of the plurality of lenses.

\* \* \* \* \*